US010318958B2

(12) United States Patent
Kim

(10) Patent No.: US 10,318,958 B2
(45) Date of Patent: Jun. 11, 2019

(54) SMART WATCH AND OPERATING METHOD USING THE SAME

(71) Applicant: Jong Ho Kim, Seoul (KR)

(72) Inventor: Jong Ho Kim, Seoul (KR)

( * ) Notice: Subject to any disclaimer, the term of this patent is extended or adjusted under 35 U.S.C. 154(b) by 234 days.

(21) Appl. No.: 15/221,650

(22) Filed: Jul. 28, 2016

(65) Prior Publication Data

US 2017/0032168 A1 Feb. 2, 2017

Related U.S. Application Data

(60) Provisional application No. 62/198,042, filed on Jul. 28, 2015.

(51) Int. Cl.
*G04G 21/08* (2010.01)
*G06Q 20/40* (2012.01)
(Continued)

(52) U.S. Cl.
CPC ....... *G06Q 20/40145* (2013.01); *G04G 21/08* (2013.01); *G06F 1/163* (2013.01);
(Continued)

(58) Field of Classification Search
CPC ............. G06K 9/00013; G06K 9/0002; G06Q 20/40145; G04G 21/00; G06F 1/163; G06F 21/00; G06F 21/32; G06F 3/0346; G06F 3/0362; G06F 3/0414; G06F 3/0416; G06F 3/0485
See application file for complete search history.

(56) References Cited

U.S. PATENT DOCUMENTS 9,779,277 B2 * 10/2017 Ohtsuka ............. G06K 9/00013
2011/0129128 A1 * 6/2011 Makimoto ......... G06K 9/00013
382/124
(Continued)

FOREIGN PATENT DOCUMENTS

JP WO 2017159101 A1 * 9/2017 ........... A61B 5/1172

*Primary Examiner* — Hai Phan
*Assistant Examiner* — Anthony D Afrifa-Kyei
(74) *Attorney, Agent, or Firm* — Rabin & Berdo, P.C.

(57) ABSTRACT

Disclosed are a smart watch and a method of operating the same, in which fingerprint information and biometric information are measured by a single motion, a certain duration is set such that biometric information measured in the duration is generated into authenticated information or secured information, and transmitted or output to the outside. The smart watch includes a body, a fingerprint information acquisition unit provided on one surface of the body and configured to acquire fingerprint information about a user by a touch pressure applied from an outside, a biometric information acquisition unit provided on the other surface of the body, opposite to the one surface of the body, and configured to acquire biometric information about the user while contacting the skin of the user, and a control unit provided in the body and configured to acquire the fingerprint information and the biometric information for a predetermined period of time based on a point in time at which the touch pressure is applied if the touch pressure is greater than a reference pressure, and to generate user authentication information by using the acquired fingerprint information and biometric information.

19 Claims, 19 Drawing Sheets

(51) Int. Cl.
  *G06F 3/041* (2006.01)
  *G06F 3/0346* (2013.01)
  *G06F 3/0485* (2013.01)
  *G06F 3/0362* (2013.01)
  *G06F 21/00* (2013.01)
  *H04L 29/06* (2006.01)
  *G06F 1/16* (2006.01)
  *G06F 21/32* (2013.01)
  *G06K 9/00* (2006.01)
  *H04W 12/06* (2009.01)
  *H04W 4/80* (2018.01)

(52) U.S. Cl.
  CPC .......... *G06F 3/0346* (2013.01); *G06F 3/0362* (2013.01); *G06F 3/0414* (2013.01); *G06F 3/0416* (2013.01); *G06F 3/0485* (2013.01); *G06F 21/00* (2013.01); *G06F 21/32* (2013.01); *G06K 9/0002* (2013.01); *G06K 9/00892* (2013.01); *H04L 63/0861* (2013.01); *H04W 12/06* (2013.01); *G06K 2009/00939* (2013.01); *H04W 4/80* (2018.02)

(56) References Cited

U.S. PATENT DOCUMENTS

| | | | |
|---|---|---|---|
| 2014/0107501 A1* | 4/2014 | Komanduri | A61B 5/0205 600/484 |
| 2014/0135631 A1* | 5/2014 | Brumback | A61B 5/02438 600/479 |
| 2014/0308930 A1* | 10/2014 | Tran | H04W 4/50 455/414.1 |
| 2015/0035644 A1* | 2/2015 | June | G07C 11/00 340/5.61 |
| 2015/0186705 A1* | 7/2015 | Magi | G06K 9/0002 382/125 |
| 2015/0253886 A1* | 9/2015 | Wei | G06F 3/041 345/173 |
| 2016/0004224 A1* | 1/2016 | Pi | G04G 21/025 368/10 |
| 2016/0109861 A1* | 4/2016 | Kim | G04G 21/08 368/69 |

* cited by examiner

SMART WATCH AND OPERATING METHOD USING THE SAME

BACKGROUND

1. Field of the Invention

The present invention relates to a smart watch capable of acquiring both of fingerprint information and biometric information by a single motion, and a method of operating the same.

2. Discussion of Related Art

Mobile terminals are configured to perform various functions, such as data and voice communications, photograph or moving picture capturing through a camera, voice storing, music files playback through a speaker system, and image or video display. The mobile terminal is further provided with a function to execute a game in some cases, and the mobile terminal is implemented as a multimedia device in some cases. In addition, the mobile terminals of today receive broadcasting signals or multicast signals, allowing users to watch videos or television programs.

In order to support and improve the functions of the mobile terminals, there have been continuous efforts, including changing or reforming not only the structural components of the mobile terminal but also the software or hardware of the mobile terminal.

In general, biometrics refers to technology for authenticating or identifying individuals by measuring physiological or behavioral characteristics with an automated device. Currently, biometrics using biometric features of a human, such as fingerprints, faces, palmprints, hand geometry, a retina, an iris, voice and signature are being developed and used, and biometrics using blood vessels and DNA are also being developed. Accordingly, interest in the biometrics is rapidly increasing, accelerating the standardization of related technology for the biometrics.

In the biometrics, a heart rhythm has different frequencies and waveforms among respective users, and the heart rhythms measured by an automated device may be effectively used to authenticate or identify individuals.

However, current studies have been conducted only by a working group (WG) for standardizing the biometrics or the range thereof, without providing a method of authenticating a user by using biometric information, a method of controlling a device by using biometric recognition when the device is held or contacted by a hand, and various methods of controlling an application based on the above described methods.

SUMMARY OF THE INVENTION

The present invention is directed to a smart watch capable of measuring fingerprint information and biometric information by a single motion, setting a certain duration such that biometric information measured in the duration is authenticated or secured, and transmitted or output to the outside, and a method of operating the same.

According to an aspect of the present invention, there is provided a smart watch including: a body, a fingerprint information acquisition unit, a biometric information acquisition unit and a control unit. The fingerprint information acquisition unit may be provided on one surface of the body and configured to acquire fingerprint information about a user by a touch pressure applied from outside. The biometric information acquisition unit may be provided on the other surface of the body, opposite to the one surface of the body, and configured to acquire biometric information about the user while contacting a skin of the user. The control unit may be provided in the body and configured to acquire the fingerprint information and the biometric information for a predetermined period of time based on a point in time at which the touch pressure is applied when the touch pressure is greater than a reference pressure, and to generate user authentication information by using the acquired fingerprint information and biometric information.

The body may include a main member and a band member. The main member may be provided at one surface thereof on which a fingerprint information acquiring unit including a fingerprint information sensor is formed and, on the other surface thereof opposite to the one surface with a biometric information acquiring unit including at least one biometric information sensor protruding is formed, and in an inside thereof with the control unit electrically connected to the fingerprint information acquisition unit and the biometric information acquisition unit is formed. The band member may have one end thereof coupled to one side portion of the main member and having the other end thereof, opposite to the one end thereof formed with at least one insertion hole into which the biometric information sensor is inserted.

The biometric information acquisition unit may be further provided with a proximity sensor unit that senses a contact area or a degree of proximity with respect to the skin of the user, and the biometric information acquisition unit may operate the biometric information sensor when the contact area or the degree of proximity sensed by the proximity sensor unit satisfies predetermined condition information.

The smart watch may further include a display unit provided at the one surface of the main member or at the band member and electrically connected to the control unit to display a graphic user interface (GUI) corresponding to the fingerprint information or the biometric information, wherein the display unit may output predetermined guide information until the contact area or the degree of proximity sensed by the proximity sensor unit satisfies the predetermined condition information.

The biometric information sensor may sense contact with the insertion hole or a state of approach to the insertion hole within a predetermined distance, and the control unit, when the biometric information sensor is in contact with the insertion hole or in a state of approach to the insertion hole within the predetermined distance, may convert an operation mode of the smart watch into an idle mode such that the biometric information acquisition unit operates to acquire first biometric information for a first period of time from a point in time of the contact with the insertion hole or the state of approach to the insertion hole within a predetermined distance.

A pressure sensor to sense a touch pressure applied to the fingerprint information acquisition unit may be further provided at the one surface of the main member, and the control unit, when a touch pressure sensed by the pressure sensor is equal to or greater than the reference pressure, may convert an operation mode of the smart watch into an enabled mode such that the fingerprint information acquisition unit and the biometric information acquisition unit operate to acquire fingerprint information and second biometric information for a second period of time from a point in time when the touch pressure sensed by the pressure sensor is greater than the reference pressure, and the second period of time may be a period of time for which the touch pressure is maintained within a predetermined range.

The display unit formed on the band member may be provided with a biometric information acquisition unit including at least one protruded biometric information sensor at one surface thereof contacting the skin.

A lighting guide unit that is turned on when the control unit is in an enabled mode may be provided at the one surface of the main member, and a haptic driving unit that operates when the control unit is in an enabled mode may be provided at the other surface or inside of the main member.

The control unit may a memory unit, an authentication information generation unit, a security authentication unit and an information transmitting unit. The memory unit may be configured to store the first biometric information, the second biometric information, fingerprint information, previously measured fingerprint information, information about a point in time when each of the first biometric information, the second biometric information, the fingerprint information and the previously measured fingerprint information is acquired, information about a point in time when the touch pressure is equal to or greater than the reference pressure, and the user authentication information. The authentication information generation unit may be configured to generate the user authentication information by applying the fingerprint information and the second biometric information to a predetermined authentication program. The security authentication unit may be configured to perform authentication on the user authentication information and authentication request information that is received from the fingerprint information acquisition unit or an external device. The information transmitting unit may be configured to transmit the fingerprint information and the second biometric information to the display unit or the external device after the authentication is completed. The memory unit may store information about a receiver to which the first biometric information, the second biometric information and the fingerprint information are transmitted through the information transmission by periods or upon occurrence of an event.

The control unit may further include a motion sensing unit, wherein the control unit may acquire the fingerprint information and the second biometric information about the user through the fingerprint information acquisition unit and the biometric information acquisition unit and when a motion of the user is sensed through the motion sensing unit, may store the acquired fingerprint information and the acquired second biometric information through the memory unit or may transmit the acquired fingerprint information and the acquired second biometric information through the information transmitting unit.

The control unit may further include a data processing unit configured to perform datamining on the first biometric information and the second biometric information that are stored in the memory unit, wherein the information transmitting unit may transmit the information having been subjected to the datamining to the display unit or the external device after the authentication is completed.

A stem that is rotatable may be provided at one side of the display unit, wherein the control unit may increase a scrolling speed of the display unit when the stem rotates in a direction opposite to a direction in which a wrist of a user wearing the smart watch is rotated.

The control unit may further include an emotion information calculation unit configured to calculate emotion information about the user by applying the second biometric information to a predetermined state estimation algorithm, wherein the information transmitting unit may transmit the emotion information to the display unit or the external device after the authentication is completed.

The memory unit may store a smart application to perform a plurality of additional functions of the smart watch, wherein the control unit may q include a signal receiving unit configured to receive at least one event signal from the external device, and an interface unit configured to perform an additional function corresponding to the at least one event signal by execution of the smart application.

The memory unit may store fingerprint information about a plurality of fingers of the user and a smart application configured to perform additional functions corresponding to the respective pieces of fingerprint information, wherein the control unit may further include a fingerprint matching unit configured to match the respective pieces of fingerprint information about the plurality of fingers with the additional functions corresponding to the respective pieces of fingerprint information.

The memory unit may store a smart application configured to perform a payment function, and in accordance with the emotion information, perform a payment authentication function, wherein the control unit may further include a payment authentication unit configured to stop the payment function or cancel payment when the emotion information corresponds to predetermined payment authentication non-conformity condition information.

The control unit may further include an emergency situation determination unit, a global positioning system (GPS) unit and an event occurrence determination unit. The emergency situation determination unit may be configured to determine occurrence of an event when the first biometric information and the second biometric information correspond to predetermined emergency determination condition information. The global positioning system (GPS) unit may be configured to detect location information about the smart watch. The event occurrence determination unit may be configured to determine that an event has occurred when the location information is determined to be within a predetermined zone.

The memory unit may store authentication information about another user corresponding to the authentication information about the user, and the security authentication unit may complete the authentication by using the authentication information about the other user upon receiving authentication request information from the external device.

According to another aspect of the present invention, there is provided a smart watch including: a body, a fingerprint information acquisition unit, a first biometric information acquisition unit, a second biometric information acquisition unit and a control unit. The fingerprint information acquisition unit may be provided on one surface of the body and configured to acquire fingerprint information about a user by a touch pressure applied from an outside. The first biometric information acquisition unit and the second biometric information acquisition unit may be respectively provided at a first area and a second area of the other surface of the body, opposite to the one surface of the body, and configured to acquire biometric information about the user while in contact with a skin of the user. The control unit may be provided in the body and configured to acquire fingerprint information and biometric information about the user by using the fingerprint information acquisition unit, and the first biometric information or the second biometric information units for a predetermined period of time based on a point in time when the touch pressure is applied when the touch pressure is greater than a reference pressure.

According to another aspect of the present invention, there is provided a method of operating a smart watch provided at one surface thereof with a fingerprint information acquisition unit and at the other surface thereof, opposite to the one surface, with a biometric information acquisition unit, the method including: a first operation of sensing a touch pressure applied to the fingerprint information acquisition unit; a second operation of comparing a magnitude of the touch pressure with a magnitude of a predetermined reference pressure; a third operation of acquiring fingerprint information and biometric information about a user by using the fingerprint information acquisition unit and the biometric information acquisition unit for a predetermined period of time based on a point in time when the touch pressure is applied when the touch pressure is greater than the reference pressure; and a fourth operation generating user authentication information by using the fingerprint information and the biometric information acquired in the third operation.

As is apparent from the above, the smart watch according to an exemplary embodiment of the present invention and a method of operating the same can measure fingerprint information and biometric information in a single motion, set a specific duration so that biometric information measured in the specific duration is authenticated or secured, and transmitted or output to the outside.

In addition, the smart watch according to an exemplary embodiment of the present invention and a method of operating the same can convert a fingerprint sensor and an optical sensor from an idle mode, which corresponds to a disabled state, into an enabled state, by sensing a touch pressure of a predetermined condition or above, store fingerprint information and biometric information within a specific duration at the time of being converted into the enabled mode so that the fingerprint information and the biometric information may be tagged with each other, accessed or transmitted, or may be used as authenticated biometric information in response to occurrence of an event from an external device.

In addition, the smart watch according to an exemplary embodiment of the present invention and a method of operating the same can combine fingerprint information and biometric information with each other to generate information with high level of security, or enable a high level of authentication procedure to be performed in a series of operations.

In addition, the smart watch according to an exemplary embodiment of the present invention and a method of operating the same can instantly fix the biometric information acquisition unit by a touch pressure on the fingerprint information acquisition unit, thereby minimizing the influence due to a movement of the biometric information acquisition unit when biometric information is acquired while improving precision in acquiring the biometric information.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
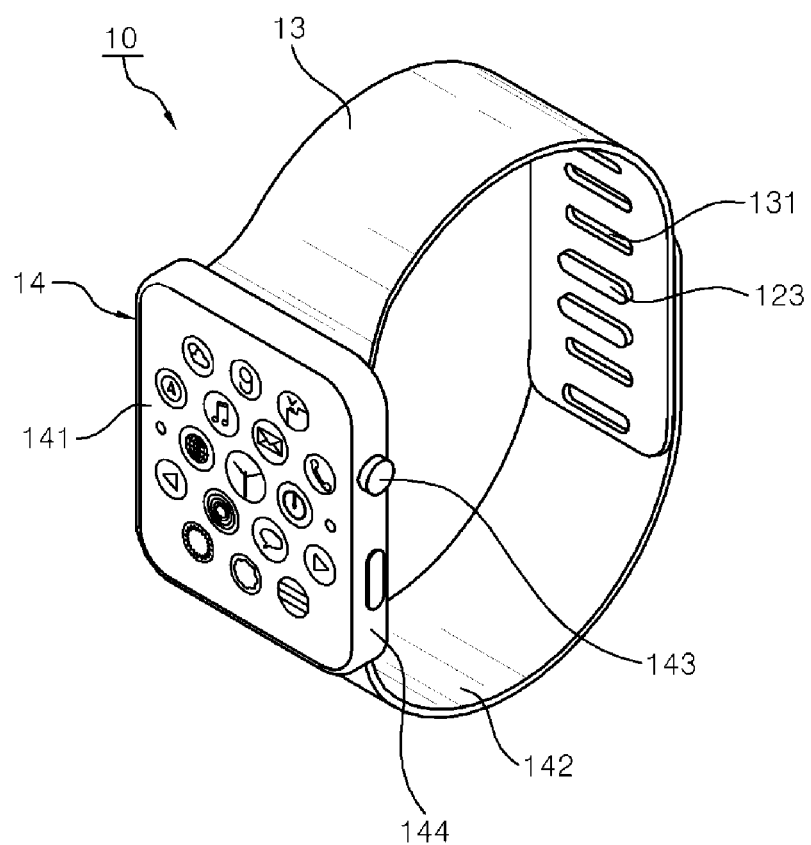
FIG. 1 is a perspective view illustrating a smart watch according to an exemplary embodiment of the present invention.

Terms used in the specification will be described in brief, before exemplary embodiments of the present invention are described in detail.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. The terms "unit" and "part" means a unit for processing at least one function or operation, and may be implemented in hardware or software, or combination of hardware and software.

Hereinafter, exemplary embodiments of the present invention will be described in detail with reference to the accompanying drawings, and thus it can be easily implemented by those skilled in the art. The present invention is not limited to the exemplary embodiments described below, and can be implemented in various forms. Descriptions of well-known functions and structures are omitted to enhance clarity and conciseness, and the same reference numerals are used to designate the same elements throughout the drawings.

Figure 2:
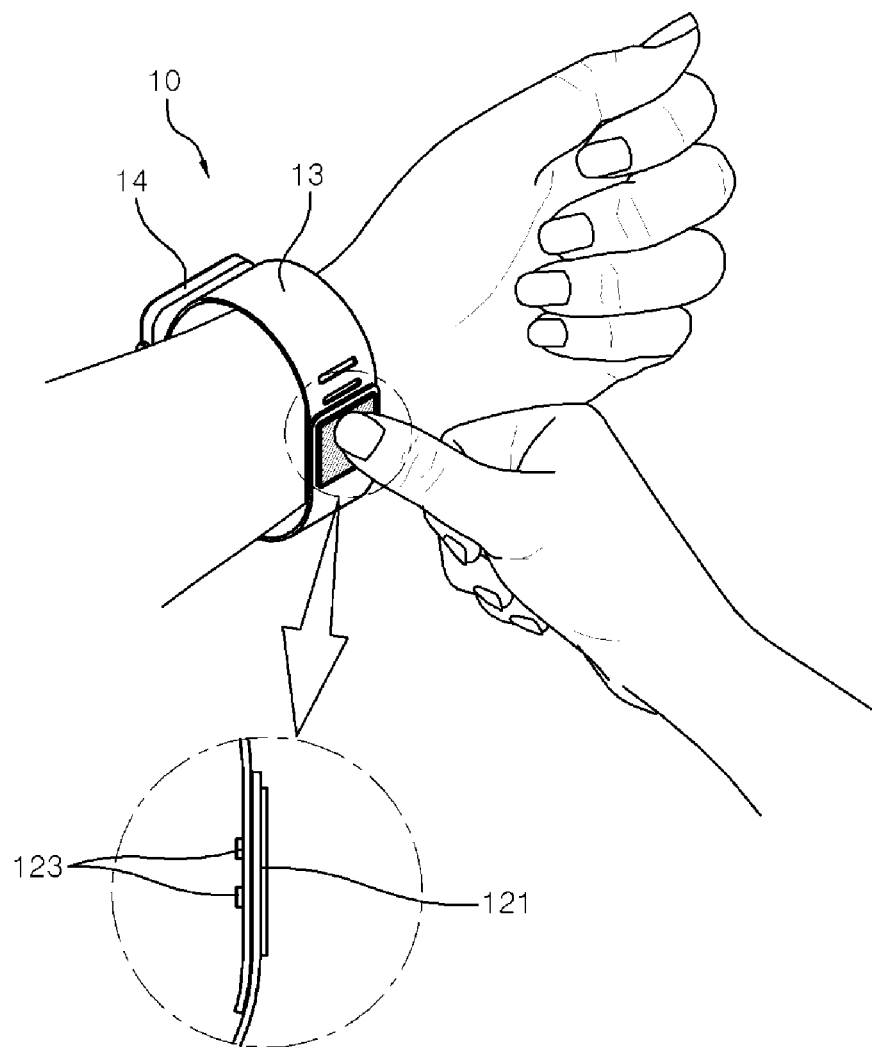
FIG. 2 is a perspective view illustrating a state in which fingerprint information is input with the smart watch shown in FIG. 1 worn by a user.
Figure 3:
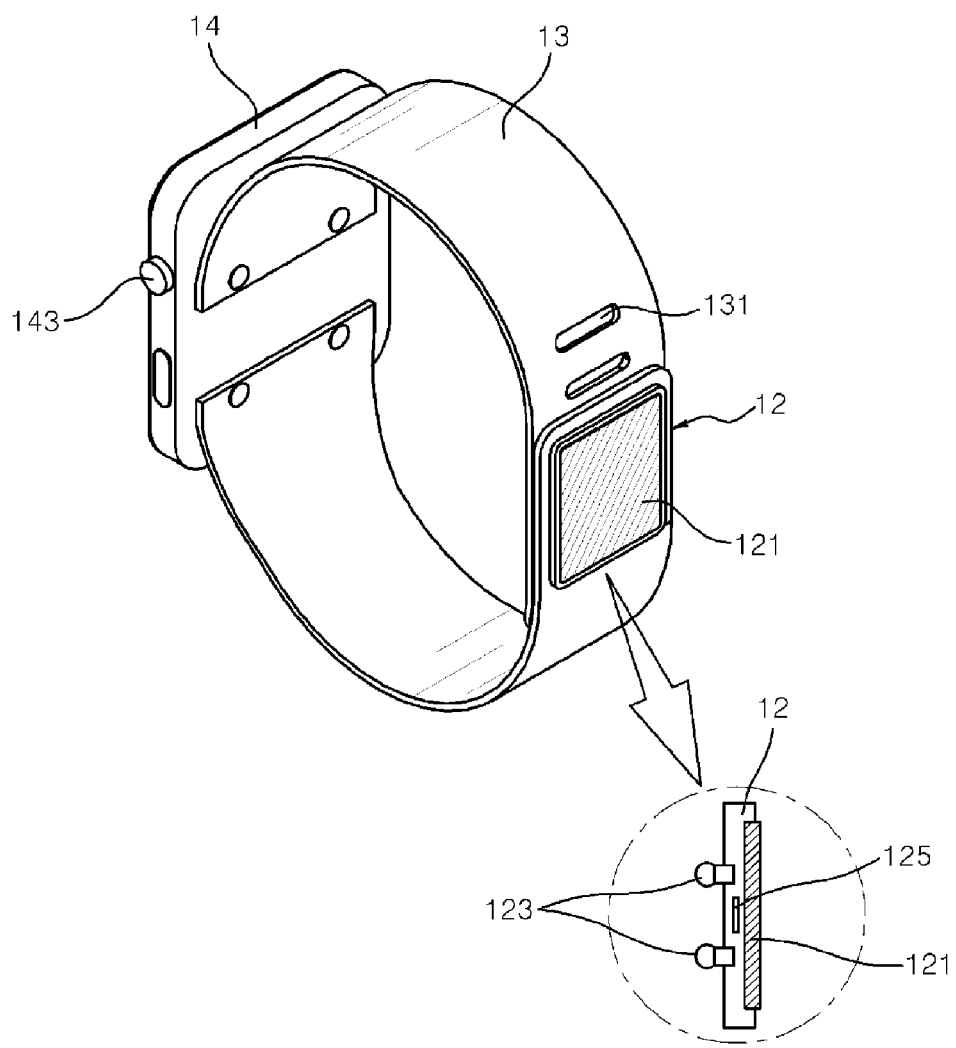
FIG. 3 is a perspective view illustrating a fingerprint information acquisition unit and a biometric information acquisition unit of the smart watch shown in FIG. 1.
Figure 4A:
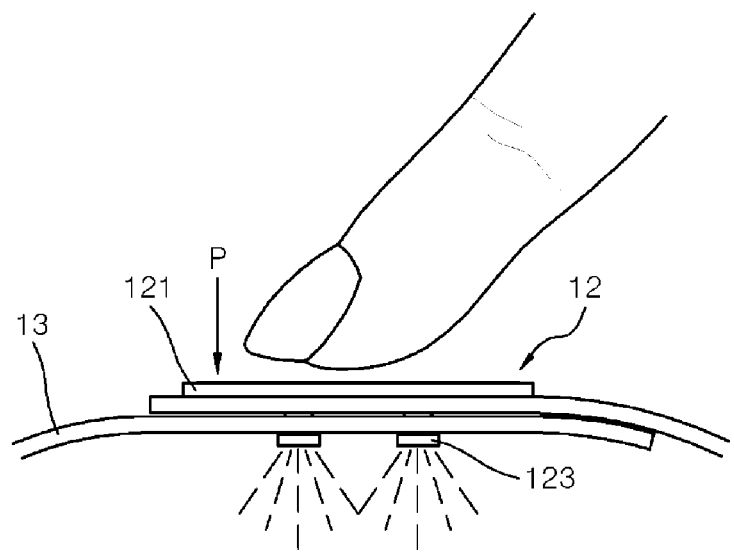
FIG. 4A is a diagram illustrating a state in which fingerprint information is input to the fingerprint information acquisition unit shown in FIG. 3.
Figure 4B:
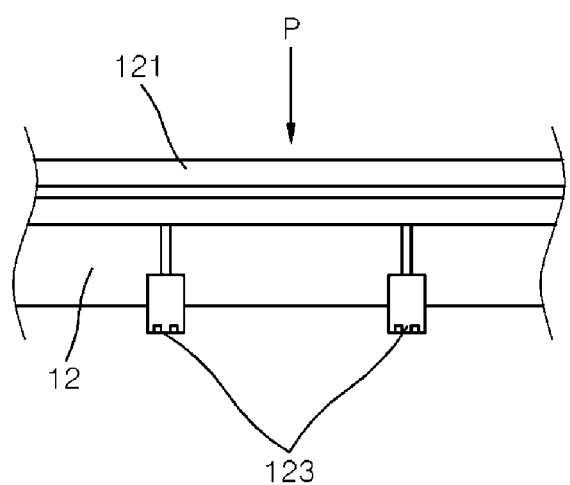
FIG. 4B is a diagram illustrating an alternative example of the biometric information acquisition unit shown in FIG. 3.
Figure 5:
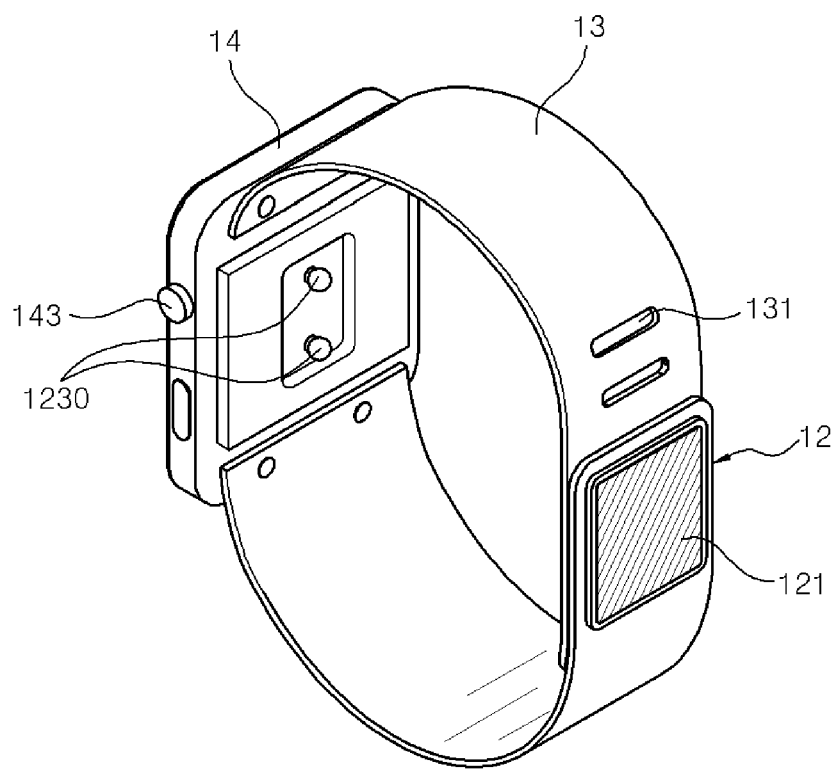
FIG. 5 is a diagram illustrating an alternative example of a display unit provided on a smart watch according to an exemplary embodiment of the present invention.
Figure 6:
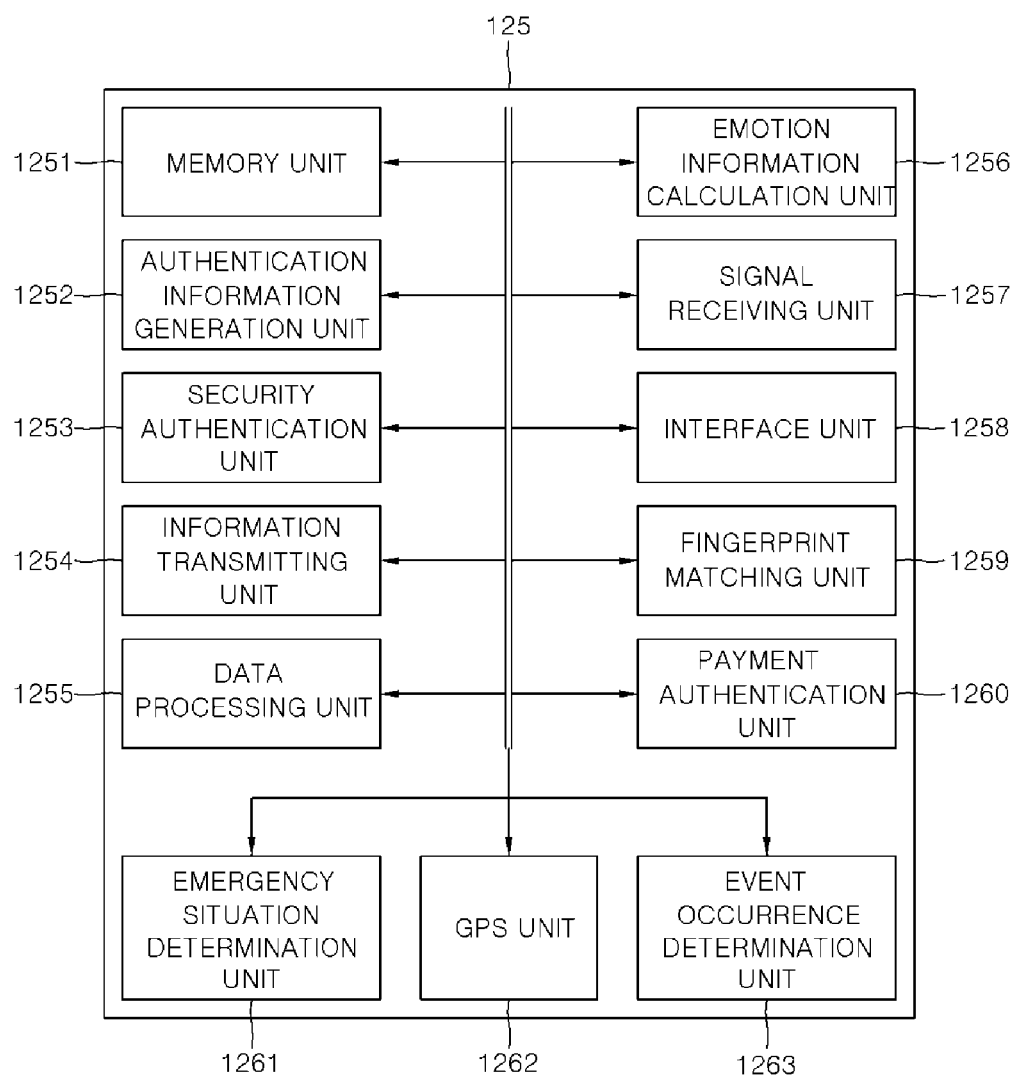
FIG. 6 is a block diagram schematically illustrating a control unit included in a smart watch according to an exemplary embodiment of the present invention.

FIG. 1 is a perspective view illustrating a smart watch according to an exemplary embodiment of the present invention, FIG. 2 is a perspective view illustrating a state in which fingerprint information is input with the smart watch shown in FIG. 1 worn by a user, FIG. 3 is a perspective view illustrating a fingerprint information acquisition unit and a biometric information acquisition unit of the smart watch shown in FIG. 1, FIG. 4A is a diagram illustrating a state in which fingerprint information is input on the fingerprint information acquisition unit shown in FIG. 3, FIG. 4B is a diagram illustrating an alternative example of the biometric information acquisition unit shown in FIG. 3, FIG. 5 is a diagram illustrating an alternative example of a display unit provided on a smart watch according to an exemplary embodiment of the present invention, and FIG. 6 is a block diagram schematically illustrating a control unit included in a smart watch according to an exemplary embodiment of the present invention.

Referring to FIGS. 1 to 3, the smart watch according to an exemplary embodiment of the present invention is an apparatus that is worn on a part of a body of a user, and configured to measure fingerprint information and biometric information about the user through a single motion, the smart watch including a body 10, a fingerprint information acquisition unit 121, a biometric information acquisition unit 123 and a control unit 125.

The smart watch has the body 10 with the fingerprint information acquisition unit 121 at one surface thereof and the biometric information acquisition unit 123 at the other surface thereof opposite to the one surface, and the fingerprint information and/or the biometric information are/is authenticated or secured through the control unit 125 provided in the body 10, and transmitted to the outside.

The body 10 is provided in the form of a housing having at least two surfaces, or may be provided in the form of a watch that is wearable on a body of a user. In addition, the body 10 may be implemented as a band member 13 which will be described below, or may be implemented as an accessory in the form of a clip or a cap inserted into or covering a desired area of the band member 13. In addition, the body 10 may be implemented to transmit and receive sensing data by an electrical connection through the band member 13, or exchange sensing data through a wireless connection (for example, near field communication (NFC) and Bluetooth). Meanwhile, the body 10 may use a primary battery or a secondary battery, or may be supplied with power in a wired scheme or a wireless scheme.

As an exemplary embodiment of the present invention, in which the body 10 is provided in the form of a housing, the fingerprint information acquisition unit 121 is provided on one surface of the body 10 to acquire fingerprint information about a user by a touch pressure applied from an outside, and the biometric information acquisition unit 123 is provided on the other surface of the body 10 to acquire biometric information about the user while in contact with the skin of the user. In this case, the fingerprint information acquisition unit 121 may be provided on the one surface of the body 10 while coupled to a certain button, or may be integrally formed with a display device.

In addition, on one surface of the body 10, a sensor unit (not shown) including at least one of a touch sensor, a pressure sensor, an illumination sensor, a proximity sensor, an image sensor and an acceleration sensor is further provided. Details of the sensor unit will be described below.

Meanwhile, the one surface of the body 10 is defined as a surface oriented outward when the smart watch is worn on a body, and the other surface is defined as a surface which the skin of the user approaches or contacts.

The following description will be made based on the body 10 that is provided in the form of a watch according to another exemplary embodiment of the present invention. Functions of the body 10 according to the exemplary embodiment of the present invention, implemented by components forming the body 10, respectively, may be implemented by the body 10 according to the above exemplary embodiment of the present invention depending on a design.

When the body 10 according to the exemplary embodiment of the present invention is provided in the form of a watch, the body 10 includes a main member 12, a band member 13 and a display unit 14.

The main member 12 has the fingerprint information acquisition unit 121 formed on one surface thereof and the biometric information acquisition unit 123 formed on the other surface opposite the one surface.

The fingerprint information acquisition unit 121 includes at least one fingerprint information sensor that senses a touch pressure applied to the one surface of the main member 12 and a fingerprint of a finger. The fingerprint information sensor includes a pressure sensor that physically or electrically senses a touch pressure of a user applied to the fingerprint information acquisition unit 121 and a fingerprint sensor that senses fingerprints of fingers. The touch pressure applied to the fingerprint information acquisition unit 121 represents a pressure applied in a direction perpendicular to the one surface of the main member 12.

The biometric information acquisition unit 123 includes at least one biometric information sensor that protrudes from the other surface of the main member 12 to measure biometric information about the inside of a human body. The biometric information sensor may be an optical sensor that radiates light onto the skin, which comes into contact with or is adjacent to the biometric information sensor in a state in which the smart watch is worn by the user, to sense information about the shape of a blood vessel or blood flow. The optical sensor may include at least one of an electrocardiography (ECG) sensor, a photoplethysmography (PPG) sensor, a heart rate monitor (HRM) sensor, and a $SPO_2$ sensor. The optical sensor may include a structure capable of increasing a contact or the degree of proximity between the skin and the optical sensor in a state in which the smart watch is worn by the user. In particular, the biometric information acquisition unit provided on the other surface may be designed to have a structure capable of increasing contact or the degree of proximity upon occurrence of a touch pressure on the fingerprint sensor. The optical sensor may perform biometric authentication on various biometric information, such as stress index, degree of excitement, alcohol consumption and emotional state, and the shape of a blood vessel by processing sensing information, such as an electrocardiogram (ECG), electroencephalogram (EEG), and photoplethysmogram (PPG) and $SPO_2$ content, about the skin which makes contact with or approaches the optical sensor in a state in which the smart watch is worn by the user. In addition, the biometric information acquisition unit 123 may be further provided with a proximity sensor (not shown) to sense a contact area or the degree of proximity with respect to the skin of a user. Accordingly, the control unit 125 may operate the biometric information sensor if the contact area or the degree of proximity sensed by the proximity sensor unit satisfies predetermined condition information. The predetermined condition information is information having a conditional value of the biometric information sensor about a contact area or the degree of proximity with respect to a skin of a user.

Hereinafter, the following description will be made based on an optical sensor as an example of the biometric information sensor.

A heart rate sensor, a type of the optical sensor, may employ photoplethysmography. Based on the principle that blood reflects red light and absorbs green light, the biometric information sensor may sense the amount of blood flowing in the wrist of a user at a designated time by using a light sensitive photodiode together with an LED indicator light connected to the photo diode as a pair. When the heart beats, the blood flow of the wrist, that is, the amount of absorption of green light, is increased, and the amount of blood flow between heat beats decreases. By flicking the LED light several hundred times per second through the heart rate sensor, the number of heartbeats per minute, that is, a heart rate may be calculated. In addition, the heart rate sensor may be designed to perform calibration on a low level signal by increasing both of the brightness of the LED and the sampling speed. Stress is a symptom caused by physical or mental strain, and the level of stress of a user is checked by measuring change in the interval between heartbeats (heart rate variability: HRV) and HRV data of the user is compared with data of a group having biometric information similar to that of the user (for example, a group of healthy people at the same age of the user), thereby checking the level of stress of the user.

In addition, the optical sensor comes into contact with the skin of the user by an external pressure applied to the fingerprint information acquisition unit 121, and measures the oxygen saturation of arteries in the skin. The plurality of optical sensors are provided, so that the plurality of optical sensors alternately measure the biometric information including the oxygen saturation of the artery, or simultaneously measure the biometric information including the oxygen saturation of the artery. The optical sensor may be provided as a micro imaging sensor as shown in FIG. 4B, and the probe may be a Raman sensor probe, but the type of the optical sensor or the probe according to present invention is not limited thereto. As shown in FIG. 4A, the optical sensor radiates a laser at a predetermined intensity onto the skin by a touch pressure on the fingerprint information acquisition unit 121.

In addition, the optical sensor protrudes from the other surface of the main member 12 in a direction toward the skin, so as to monitor the biometric information while serving as a fixing latch inserted into an insertion hole 131 of the band member 13 which will be described below.

Meanwhile, the biometric information acquisition unit 123 may be mounted on an area physically independent of the other surface of the main member 12, for example, on the display unit 14 or on the band member 13. For example, as shown in FIG. 5, the biometric information acquisition unit 123 may be mounted on a surface of the display unit 14 that comes into contact with or approaches the skin. Thus, in the case in which the biometric information acquisition unit 123 is mounted on an area physically independent from the other surface of the main member 12, when the wearing of the smart watch is sensed according to the approach or contact of the biometric information acquisition unit 123 with respect to the skin, the smart watch is controlled to operate in an idle mode to acquire first biometric information through the biometric information acquisition unit 123 in real time or periodically from a point in time after the wearing is sensed, and when a touch pressure on the fingerprint information acquisition unit 121 is sensed, the smart watch is controlled to operate in an enabled mode to acquire fingerprint information and second biometric information from a point in time when the touch pressure is sensed.

In addition, the fingerprint information acquisition unit 121 may be provided in the form of buttons adjacent to the display unit 14 or physically separated from each other in the display unit 14. Through such a configuration, the fingerprint information acquisition unit 121 may sense a pressure, or a touch sensor or a fingerprint recognition integrated type display may sense a touch pressure.

In the inside of the main member 12, the control unit 125 electrically connected to the fingerprint information acquisition unit 121 and the biometric information acquisition unit 123 is mounted. The control unit 125, when a predetermined magnitude of pressure is applied to the fingerprint information acquisition unit 121, controls the biometric information acquisition unit 123, which is in contact with the skin of the user, to acquire biometric information about the user. The control unit 125 acquires fingerprint information about the user after a predetermined magnitude of touch pressure is applied to the fingerprint information acquisition unit 121, and upon occurrence of a contact of the biometric information acquisition unit 123 with the skin in response to the touch pressure on the fingerprint information acquisition unit 121, the control unit 125 controls the biometric information acquisition unit 123 to acquire biometric information about the contacted skin.

The band member 13 may be a band or a strap physically connected to the main member 12. The band member 13 has one end thereof coupled to one side of the main member 12, and the other end thereof, opposite to the one end of the band member 13, is formed with at least one insertion hole 131 into which the optical sensor is inserted. That is, according to the present invention, an end portion of the optical sensor is inserted into the insertion hole 131 without being protruded, and thus the optical sensor is prevented from being worn away. In addition, according to the present invention, the optical sensor may be enabled through an on/off operation when the optical sensor comes into contact with the skin depending on the insertion pressure of the optical sensor with respect to the insertion hole 131.

In this case, a proximity sensor may be provided at the other surface of the main member 12 or in the insertion hole 131 of the band member 13 to sense whether the optical sensor comes into contact with the insertion hole 131 or approaches the insertion hole 131 to within a predetermined distance.

Accordingly, when the biometric information acquisition unit 123 protruding from the other surface of the main member 12 is inserted into the insertion hole 131 of the band member 13, the fingerprint information acquisition unit 121 and the biometric information acquisition unit 123 each enter an idle mode, and then if a touch pressure occurs on the fingerprint information acquisition unit 121, the fingerprint information acquisition unit 121 and the biometric information acquisition unit 123 each enter an enabled mode to acquire fingerprint information and biometric information. In addition, when the acquisitions of the fingerprint information and the biometric information are completed, a tactile feedback about the completion may be provided through the contacted skin.

The idle mode measures first biometric information in real time only using the optical sensor mounted on the biometric information acquisition unit 123. In addition, when the fingerprint sensor mounted on the fingerprint information acquisition unit 121 senses a touch pressure equal to or greater than a predetermined setting value, an enable command signal is generated by the control unit 125 which is triggered by the touch pressure. The optical sensor and the fingerprint sensor each enter an enabled mode in response to the enable command signal generated by the control unit 125.

The first biometric information includes information acquired in real time in a non-invasive manner by the optical sensor mounted on the biometric information acquisition unit 123 in an idle mode, or biometric related information acquired by various sensors positioned in other locations, for example, the body 10 of the smart watch rather than the biometric information acquisition unit.

The enabled mode allows the fingerprint sensor to measure fingerprint information related to the sensed touch pressure, and allows the optical sensor to measure second biometric information about a contact area. In this case, the fingerprint sensor and the optical sensor may simultaneously or consecutively sense fingerprint information and biometric information within a predetermined period of time.

The second biometric information represents biometric information sensed by the optical sensor mounted on the biometric information acquisition unit 123 while corresponding to the touch pressure on the fingerprint information acquisition unit 121 in an enabled state. The second biometric information is biometric information obtained while the biometric information acquisition unit is in contact with a large area of the skin than when the first biometric information is obtained, thereby precisely measuring biometric information at the time of conversion into the enabled mode within a short period of time (for example, within a predetermined time between before and after the time of conversion into the enabled mode). That is, the second biometric information may be biometric information that is close to the user's current condition at the time of conversion into the enabled mode by the touch pressure.

Thereafter, the control unit 125 determines the first biometric information and the second biometric information, which have been sensed by the optical sensor by the point in time at which the touch pressure on the fingerprint sensor is sensed, as a target to be transmitted.

In this case, the biometric information to be transmitted may be the second biometric information, or the first biometric information and the second biometric information.

In addition, the control unit 125 may store to-be transmitted target biometric information, which is determined to be transmitted, tagged with fingerprint authentication data based on fingerprint information sensed to correspond to a touch pressure event, or may transmit the transmission target biometric information to a predetermined external device (for example, a device of a remote medical staff, a device of an acquaintance, a device of an emergency room, a device of a 911 emergency call center, and a device of a policeman).

The to-be transmitted target biometric information may be permitted to be used only by an authorized person after performing an authentication procedure on a device which is previously set or to which an access is allowed based on the fingerprint authentication data tagged to the to-be transmitted target biometric information.

In this case, even an external device that is not previously set or to which an access is not allowed may be assigned a right to access the information through user authentication. However, if the device fails to satisfy any of the conditions described above, the device is given a right to partly access the information, or the information is provided in another display method.

Meanwhile, the control unit 125 determines, as to-be transmitted target biometric information to be transmitted to an external device, based on a predetermined duration prior to a point in time at which a touch pressure event has occurred on the fingerprint sensor. The optical sensor may have an increased contact area with respect to the skin in accordance with a touch pressure of a user applied to the fingerprint sensor. In this manner, the optical sensor may improve biometric authentication and recognition rate of biometric information.

The inside of the main member 12 is provided with a light source unit (not shown) to radiate light toward the fingerprint information sensor and the optical sensor. The light source unit may include a light source, such as an LED or a laser, and an optical fiber to radiate light through the light source. In addition, the light source may be disposed in each direction of the fingerprint information sensor and the optical sensor, or may be provided as a single source disposed between the fingerprint sensor and the optical sensor.

In addition, the main member 12 is provided at an inside thereof or at the other surface thereof with a haptic guide unit 144 that provides the skin with a tactile feedback, that is, vibration, when the optical sensor is in contact with the skin. The control unit 125 provides a tactile feedback to the contacted skin through the haptic guide unit 144 while a touch pressure applied to the fingerprint information acquisition unit 121 is being maintained within a predetermined range, to guide so that effective information can be acquired.

Meanwhile, the main member 12 is provided at one surface thereof with a lighting guide unit 141 that is turned on to provide a visual feedback when the control unit 125 is in an enabled mode. The lighting guide unit 141 may be integrally formed with the fingerprint information acquisition unit 121 or the display unit 14, or may be implemented as a separate LED.

The control unit 125 is a microprocessor configured to control operations of the fingerprint information acquisition unit 121, the biometric information acquisition unit 123 and the display unit 14, and upon sensing a pressure applied to the fingerprint information acquisition unit 121 as being equal to or greater than a predetermined pressure, controls the fingerprint information acquisition unit 121 to measure fingerprint information about a user, and at the same time controls the biometric information acquisition unit 123 to acquire biometric information about the skin in contact with or approaching the biometric information acquisition unit 123 while the sensed touch pressure is being maintained within a predetermined period time.

In more detail, the control unit 125 performs conversion into an idle mode when the optical sensor contacts the insertion hole 131 or approaches the insertion hole 131 within a predetermined distance to operate the biometric information acquisition unit 123 to acquire first biometric information for a first period of time from the point in time at which the contact or the approach has occurred. In this case, the control unit 125 performs conversion into an enabled mode, if a touch pressure sensed by a pressure sensor provided on the fingerprint information acquisition unit 121 is equal to or greater than a predetermined pressure, to operate the fingerprint information acquisition unit 121 and the biometric information acquisition unit 123 to acquire fingerprint information and second biometric information for a second period of time from a point in time when the touch pressure is equal to or greater than a predetermined pressure. In this case, the second period of time is a duration for which the touch pressure is maintained within a predetermined range.

In other words, the control unit 125 converts operation modes of the fingerprint information acquisition unit 121 and the biometric information acquisition unit 123 into idle modes when wearing of the smart watch is sensed, and allows the fingerprint information acquisition unit 121 and the biometric information acquisition unit 123 to be converted into enabled modes according to a touch pressure on the fingerprint information acquisition unit 121 being equal to or greater than a predetermined level. Thereafter, the control unit 125 controls the fingerprint information acquisition unit 121 and the biometric information acquisition unit 123 to acquire fingerprint information and second biometric information. In this case, the first biometric information includes biometric information having a high precision at the time when a pressure equal to or greater than a predetermined level is applied, and the second biometric information includes biometric information acquired by the biometric information acquisition unit 123, and accumulated during a predetermined period of time, in real time or periodically.

In addition, the control unit 125 may appropriately change the intensity of a touch pressure required to enter an enabled mode depending on a design intention of a user, and a pressure sensing time may be set to include a predetermined duration of time between before and after a point in time at which the pressure starts to be sensed. In addition, after occurrence of the touch pressure, different from the predetermined intensity of touch pressure in the beginning, if the touch is maintained even in a release state, the control unit 125 may control the fingerprint information acquisition unit 121 and the biometric information acquisition unit 123 to acquire fingerprint information and biometric information with a relatively small pressure.

The control unit 125 is provided inside the body 10 and configured to acquire fingerprint information and biometric information for a predetermined period of time based on a point in time when a touch pressure is applied depending on the intensity of a touch pressure, and to generate user authentication information by using the acquired fingerprint information and biometric information. Details of the user authentication information will be described below.

Meanwhile, when the biometric information acquisition unit 123 includes two or more biometric information acquisition units 123, the control unit 125 may perform comprehensive biometric analysis on biometric information in real time or periodically by using respective pieces of biometric information, and by using one piece of biometric information, more detailed analysis may be performed at a predetermined point in time in the entire time duration of the other biometric information. For example, one piece of biometric information is acquired for a first period of time from the point in time at which a touch pressure has occurred on the one surface of the main member 12 after a user wears the smart watch on the user's wrist, and may acquire another piece of biometric information for a second period of time from the point in time which the smart watch is worn by the user. In addition, the first period of time may have a time duration smaller than that of the second period of time.

In this case, detailed analysis on the one piece of biometric information may be performed using information that is tagged with the one piece of biometric information when the one piece of biometric information is stored, that is, using a surrounding environment or context (schedule, etc.). The mental status or emotional status of the user at a specific point in time when the fingerprint information is acquired may be estimated through datamining. The estimated mental status or emotional status of the user may be analyzed to be visually checked based on time through the display unit 14 of the smart watch or through a display of an external device connected to the display unit 14. The mental statuses include drowsiness, abnormal, panicked and alertness, and the emotional statuses include joyfulness, sadness, surprised, fearfulness, and excitement. Hereinafter, the mental status and the emotional status will be referred to as emotion information as a whole.

In order to implement the above operation, referring to FIG. 6, the control unit 125 includes a memory unit 1251, an authentication information generation unit 1252, a security authentication unit 1253, an information transmitting unit 1254, a data processing unit 1255, an emotion information calculation unit 1256, a signal receiving unit 1257, an interface unit 1258, a fingerprint matching unit 1259, a payment authentication unit 1260, an emergency situation determination unit 1261, a global positioning system (GPS) unit 1262 and an event occurrence determination unit 1263.

The memory unit 1251 stores first biometric information, second biometric information, fingerprint information, previously measured fingerprint information, acquisition time information about each information, information about a time when a touch pressure is equal to or greater than a predetermined pressure, and user authentication information. In various authentication procedures through fingerprint information, the memory unit 1251 may store first biometric information, which is acquired while regarding much of the time at which a pressure is sensed, unlike the second biometric information, together with the time at which the first biometric information is acquired (for example, first biometric information when fingerprint payment is performed at 3:15 pm).

The time information corresponding to when the touch pressure is equal to or greater than a predetermined reference pressure may include a predetermined time interval between before and after the point in time at which the pressure is sensed.

In addition, the memory unit 1251 may store a smart application to perform a plurality of additional functions of the smart watch, fingerprint information about a plurality of fingers of the user, a smart application to perform additional functions corresponding to the respective pieces of fingerprint information, a smart application to perform a payment function and to perform a payment authentication function in accordance with the emotion information, information about a receiver to which first biometric information, second biometric information and fingerprint information are transmitted through the information transmitting unit periodically or upon occurrence of an event, and another user's authentication information corresponding to user authentication information.

The authentication information generation unit 1252 generates user authentication information by applying fingerprint information and second biometric information to a predetermined authentication program. That is, the authentication information generation unit 1252 generates user authentication information combined with security authentication about a user from fingerprint information and second biometric information by using a predetermined authentication program. In this case, the second biometric information is accompanied by an authentication procedure corresponding to fingerprint information, and stored in a security guaranteed form, or the second biometric information may be set to be automatically transmitted to a predetermined person corresponding to the fingerprint information (for example, a medical doctor or a family member) and allowed to be accessed only by the person. In this case when the second biometric information is accessed, there may be a need for a fingerprint at the point in time when the second biometric information is stored or an authentication procedure of a predetermined fingerprint related to the fingerprint information. The second biometric information has a predetermined duration and involves a specific purpose, so the second biometric information is stored in a specific storage space while tagged with a time (for example, 2015.06.25 2 PM), a surrounding environment (the temperature, GPS location) and context (schedule, etc.), in addition to fingerprint information at the point in time when the second biometric information is stored.

The security authentication unit 1253 performs authentication on user authentication information, which is generated by the authentication information generation unit 1252, and authentication request information received from the fingerprint information acquisition unit 121 or the external device (not shown). That is, the security authentication unit 1253, upon occurrence of an event accompanied by an authentication procedure corresponding to fingerprint information, performs an authentication procedure by comparing user authentication information, which is generated in the form combined with security authentication about a user from fingerprint information and second biometric information by using a predetermined authentication program, with fingerprint information actually measured by the fingerprint information acquisition unit 121 or the external device. In this case, the security authentication unit 1253, upon receiving authentication request information from the fingerprint information acquisition unit 121 of the external device, completes the authentication by using another user's authentication information.

The information transmitting unit 1254, after completion of the authentication through the security authentication unit 1253, transmits the fingerprint information and the second biometric information to the display unit 14 or the external device. In addition, the information transmitting unit 1254, after completion of the authentication through the security authentication unit 1253, may transmit information having been subject to datamining by the data processing unit 1255 to the display unit 14 or the external device. That is, the information transmitting unit 1254, after completion of the authentication corresponding to fingerprint information, may transmit the fingerprint information and second biometric information to the display unit 14 or the external device. In addition, the information transmitting unit 1254, after completion of the authentication through the security authentication unit 1253, may transmit emotion information calculated by the emotion information calculation unit 1256 to the display unit 14 or the external device.

The data processing unit 1255 performs datamining on the first biometric information and the second biometric information that are stored in the memory unit 1251. The data processing unit 1255 processes big data about each piece of biometric information (that is, the first biometric information and the second biometric information) through datamining to process the shape of a blood vessel, and a specific pulse rate, thereby performing biometric authentication on a user.

The emotion information calculation unit 1256 calculates emotion information about a user by applying the second biometric information to a predetermined state estimation algorithm. That is, the emotion information calculation unit 1256 applies biometric information, which has been subject to datamining through the data processing unit 1255, to a predetermined state estimation algorithm, thereby calculating emotion information, such as stress index, mental status (whether the user is dozing or excited, etc.).

The signal receiving unit 1257 receives at least one event signal from an external device. That is, the signal receiving unit 1257 receives an event signal corresponding to each type of smart application from an external device.

The interface unit 1258 performs an additional function corresponding to the at least one event signal received by the signal receiving unit 1257 according to execution of the smart application. To this end, the interface unit 1258 generates command signals corresponding to a plurality of applications executable in the control unit 125. To this end, the interface unit 1258 may include at least one of an unlock interface to unlock, a payment authentication interface for payment authentication, an unsecure interface to access a page including a secure content, a remote transmission interface for remotely transmitting biometric information in combination with security, a biometric information access interface to access biometric information combined with security, a secure storage interface to store a general content as a content at a higher level of security by combining fingerprint information with biometric information, and a user authentication interface that requires fingerprint information and biometric information to release the content at a higher level of security. Accordingly, the interface unit 1258 generates command signals about a unlock command, a payment authentication command, a security content access command, a biometric information security combination command, a biometric information access command, a secure content store command and a unsecure content command that are generated in response to various trigger events about respective interfaces.

In this case, the command signals are generated by various trigger events about the respective interfaces described above. The trigger event may include at least one of a touch input event applied to the band member 13, the display unit 14, the fingerprint information acquisition unit 121 and the biometric information acquisition unit 123, for example, a touch drag and a touch pressure, a gesture input event in a space, a voice input event, and an electromagnetic signal through interaction with an external device (a payment terminal, a medical device), for example, physical approach with the external device.

In addition, the interface unit 1258 may output a result of occurrence of the command signal as visual information, audible information or tactile information through the display unit 14 or the haptic guide unit 144 in real time or periodically.

The fingerprint matching unit 1259 matches fingerprint information about a plurality of fingers with additional functions corresponding to the respective pieces of fingerprinting information. The fingerprint matching unit 1259 may map fingerprints of ten fingers to respective application-related functions. Accordingly, when fingerprint information and biometric information are acquired by using an index finger rather than a thumb, the information is immediately generated as security information and transmitted to a predetermined person. In addition, if fingerprint information different from predetermined fingerprint information is sensed, a command signal corresponding to the predetermined fingerprint information may be changed.

The fingerprint matching unit 1259 may map various functions based on the order of fingerprints being used. That is, the fingerprint matching unit 1259 may acquire fingerprint information by using a thumb to acquire biometric information, and then by using an index finger, acquire other fingerprint information and biometric information. For example, when it is asked to state the degree of pain from 1 to 10 for a medical examination in order to set code patterns for fingerprints, the fingerprint matching unit 1259 may make ten fingerprints into patterned information from level 1 to 10 and transmit the patterned information. Accordingly, coded patterns for the fingers are stored based on the degree of emergency of a user, and an emergency situation or an urgency situation may be effectively coped with.

The payment authentication unit 1260 may stop a payment function or cancel payment if emotion information calculated by the emotion information calculation unit 1256 corresponds to predetermined payment authentication nonconformity condition information.

The emergency situation determination unit 1261 determines that an event has occurred if first biometric information and second biometric information correspond to predetermined emergency determination condition information.

The GPS unit 1262 detects location information about the smart watch. The GPS unit 1262 acquires location information about a user who wears the smart watch, and depending on predetermined condition information that is set according to location information, transmits the acquired location information to the payment authentication unit 1260, the emergency situation determination unit 1261 and the event occurrence determination unit 1263.

The event occurrence determination unit 1263 may determine that an event has occurred if the location information is determined to be within a predetermined zone. The control unit 125 may further include a motion sensing unit (not shown).

The control unit 125 may acquire fingerprint information and second biometric information about a user through the fingerprint information acquisition unit 121 and the biometric information acquisition unit 123, and if a user's motion is sensed by the motion sensing unit, store the fingerprint information and second biometric information in the memory unit 1251 or transmit the fingerprint information and second biometric information through the information transmitting unit 1254. For example, the motion sensing unit receives a feedback informing of a completion of acquisition of fingerprint information and biometric information after application of a user's touch pressure. If a swiping motion is performed while the touch is being maintained, a touch pressure is applied again within a predetermined period of time after release of the touch, a touch pressure is applied again within a predetermined period of time while the touch is being maintained, or rotation of a wrist is performed, a UI corresponding to an enter button is provided on the display unit within a predetermined period of time, and the motion sensing unit senses a motion to click the button. Accordingly, the control unit 125 may perform a specific function, such as payment or authentication, through fingerprint information and second biometric information that are sensed by the fingerprint information acquisition unit 121 and the biometric information acquisition unit 123 or may store the information in a folder in the smart watch through a user's motion sensed by the motion sensing unit.

The display unit 14 may be installed on one surface of the main member 12 or on the band member 13 while electrically connected to the control unit 125, to display a graphic user interface (GUI) corresponding to fingerprint information or biometric information. For example, the display unit 14 may visually display a fingerprint UI and a biometric information UI while a touch pressure on the fingerprint information acquisition unit 121 is being maintained within a predetermined range or while fingerprint information is being acquired, providing a guide for operation progress. In addition, the display unit 14, after completion of acquiring the fingerprint information and biometric information, may provide a visual feedback with regard to a state of being completed with the authentication or a result of completing the authentication. In this case, the biometric information may have a different UI depending on a measurement factor, such as a blood pressure, a heart rate and a stress index. In addition, the display unit 14 may output predetermined guide information until a contact area or a degree of proximity sensed by a proximity sensor provided on the biometric information acquisition unit 123 satisfies predetermined condition information. That is, the display unit 14 may output guide information guiding the biometric information sensor to acquire biometric information until the predetermined condition information is satisfied. In this case, the guide information may be changed depending on the type of biometric information to be acquired by a user, a desired precision in acquiring biometric information, a period for acquiring biometric information, a security level, a target to which biometric information is transmitted, an external environment (emergency), the type of an application, and the type of a task in an application. In addition, the guide information may be implemented by the time for providing a visual feedback, an audible feedback or a tactile feedback, the intensity of providing the feedback, and pattern information for providing feedback.

Meanwhile, as shown in FIGS. 1 to 5, one side of the display unit 14 may be provided with a stem 143 that is rotatable. The control unit 125 may increase a scrolling speed of the display unit 14 when a rotation direction of the stem 143 is opposite to a rotation direction of a wrist of a user who is wearing the smart watch.

In addition, the display unit 14 may be installed on the band member 13. In this case, the display unit 14 installed on the band member 13 may be provided with a biometric information acquisition unit 1230 including at least one optical sensor protruding on one side of the display unit 14 which is in contact with the skin.

Figure 7:
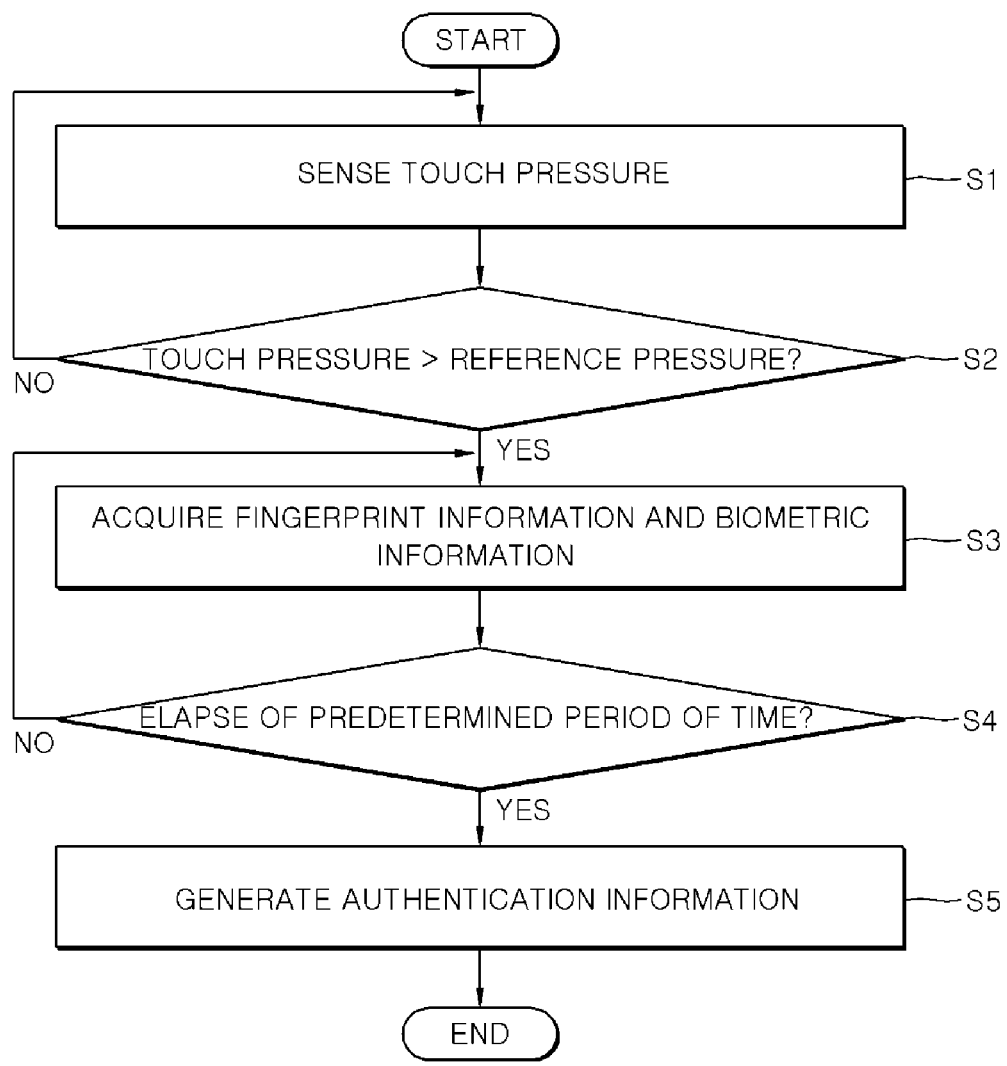
FIG. 7 is a flowchart showing an operation of a smart watch according to an exemplary embodiment of the present invention.
Figure 8:
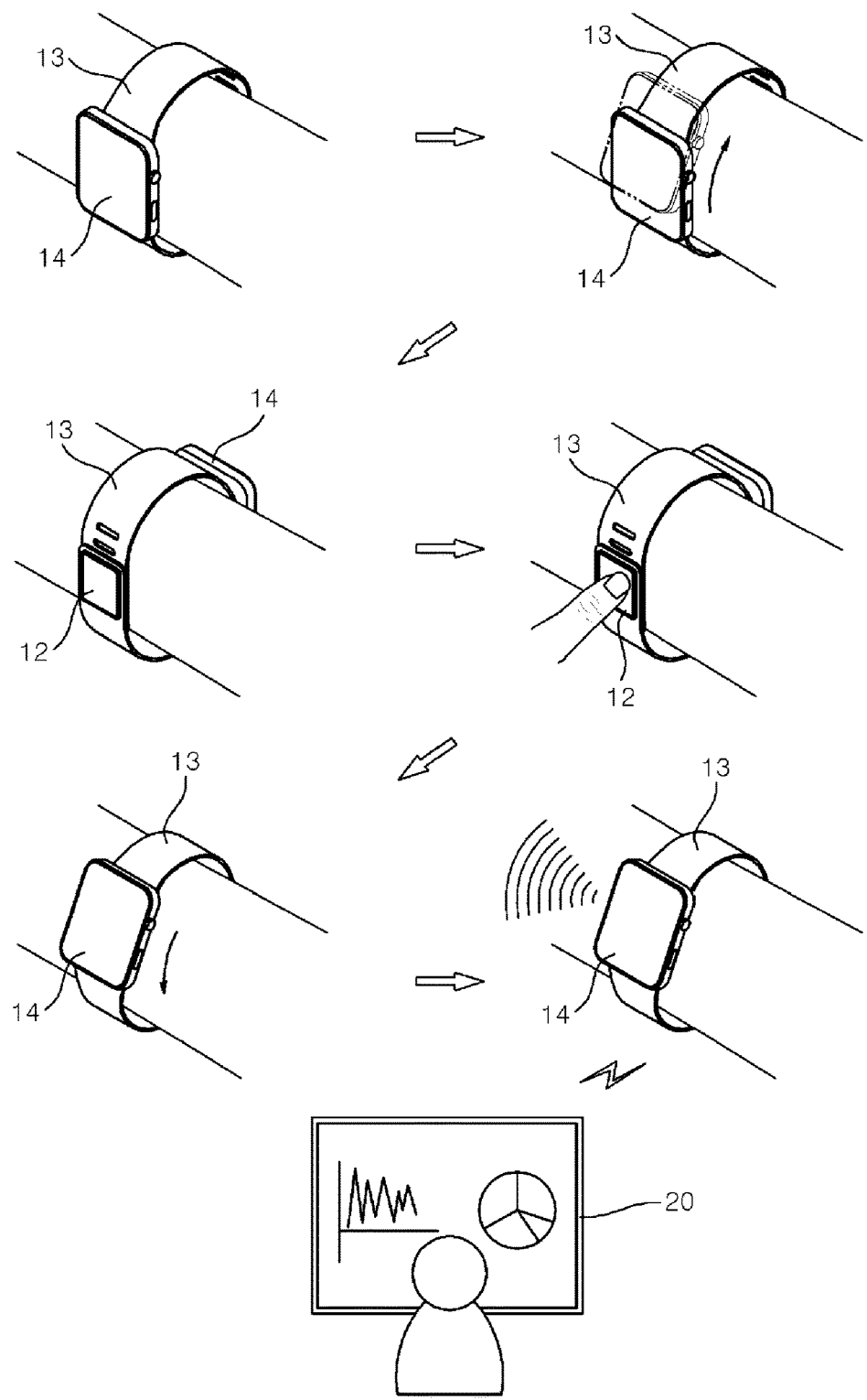
FIG. 8 is a diagram illustrating an authentication process of receiving a remote medical service by using a smart watch according to an exemplary embodiment of the present invention.
Figure 9:
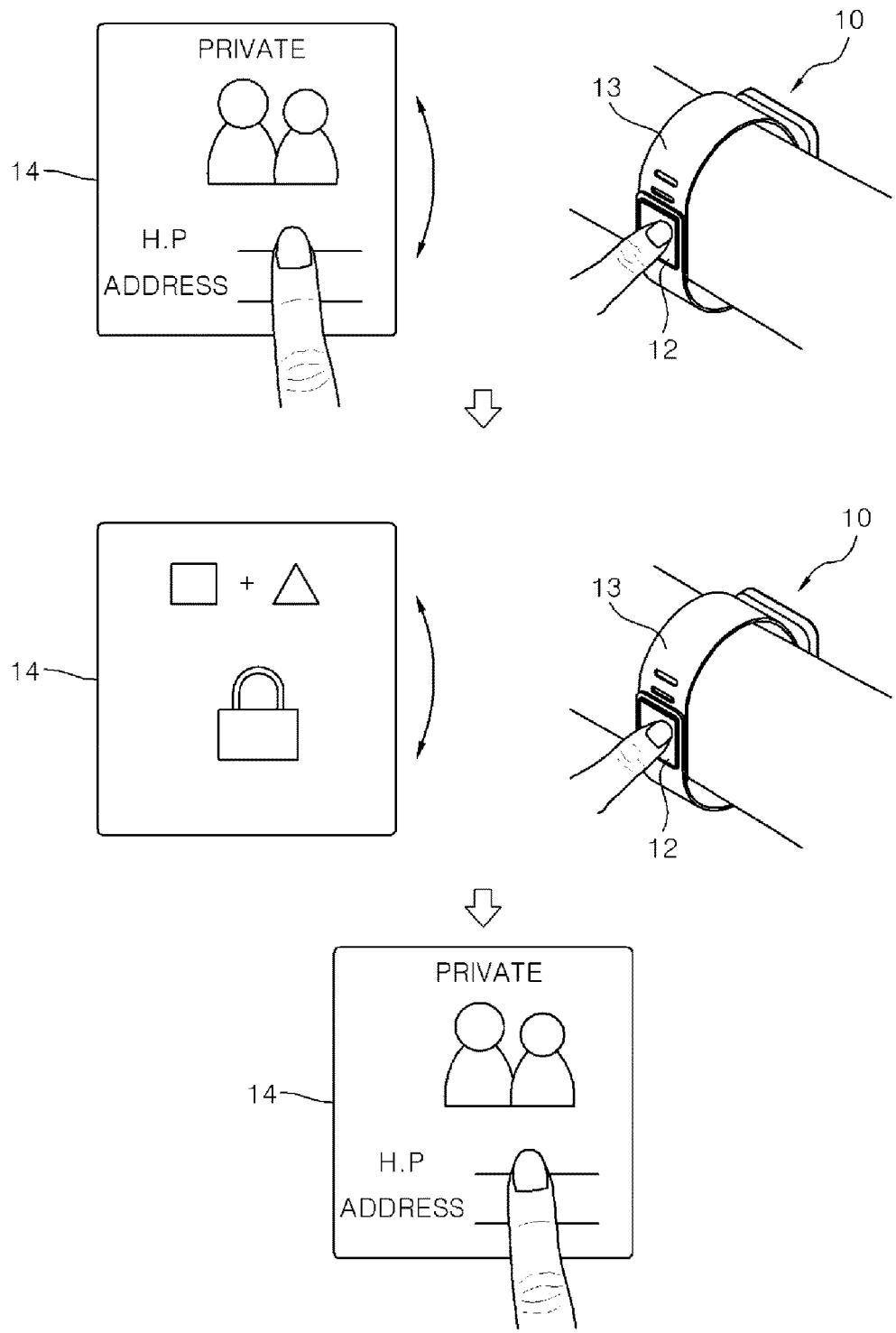
FIG. 9 is a diagram illustrating a process of generating secure content by using a smart watch according to an exemplary embodiment of the present invention.
Figure 10:
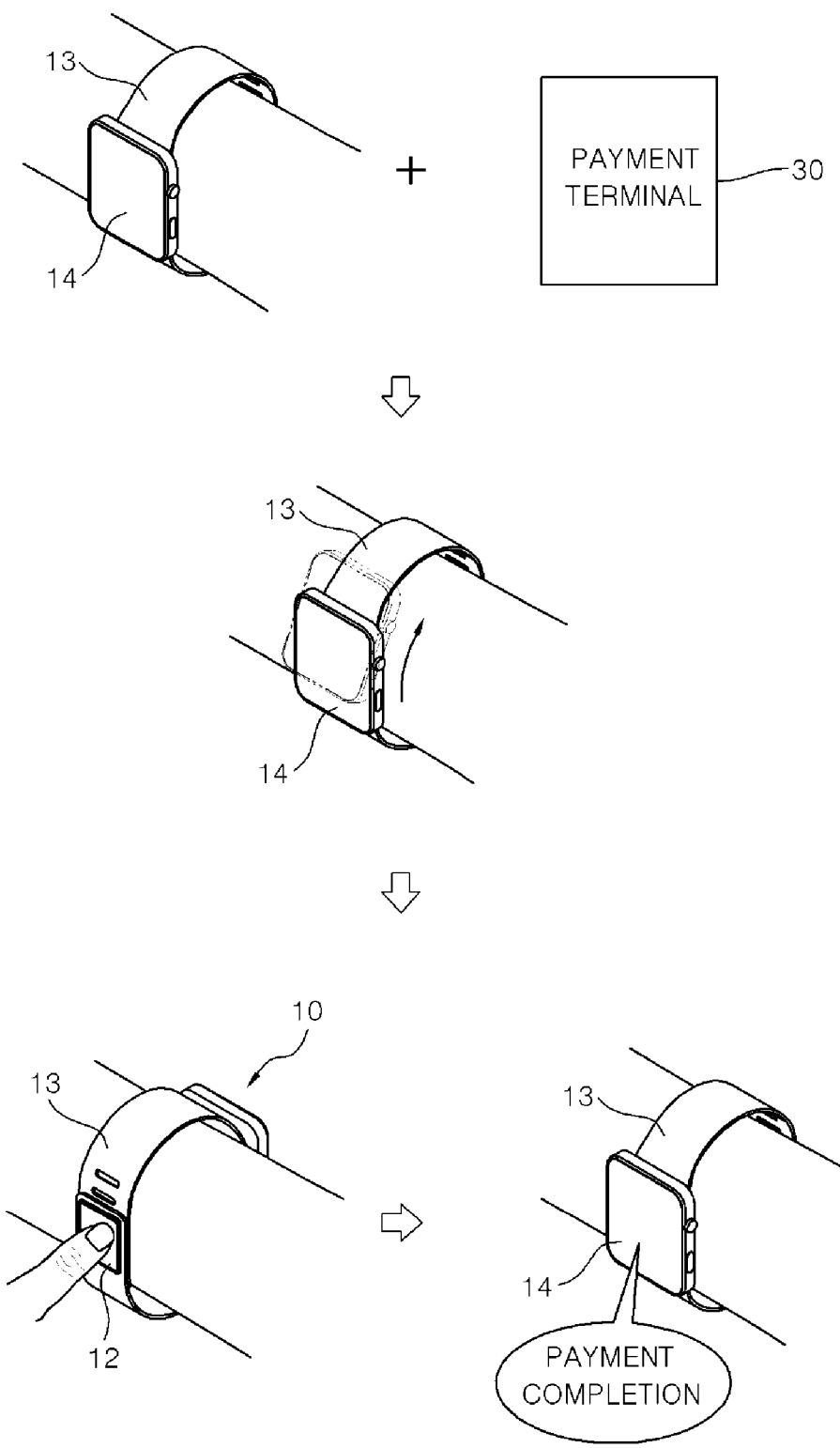
FIG. 10 is a diagram illustrating a process of receiving a payment service by using a smart watch according to an exemplary embodiment of the present invention.
Figure 11:
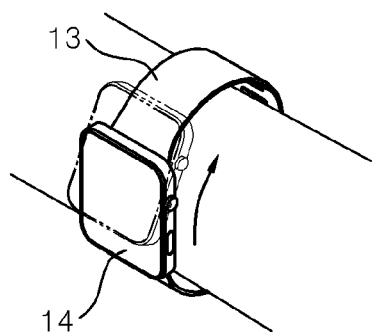
FIG. 11 is a diagram illustrating a process of transmitting biometric information to a smart watch of another user by using a smart watch according to an exemplary embodiment of the present invention.
Figure 11:
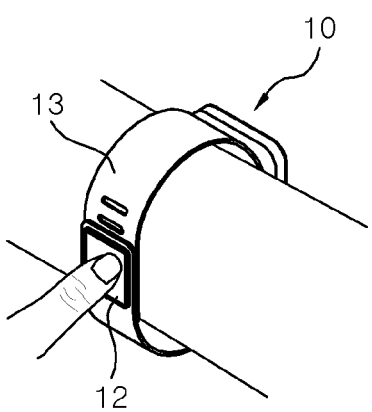
Figure 11:
Figure 11:
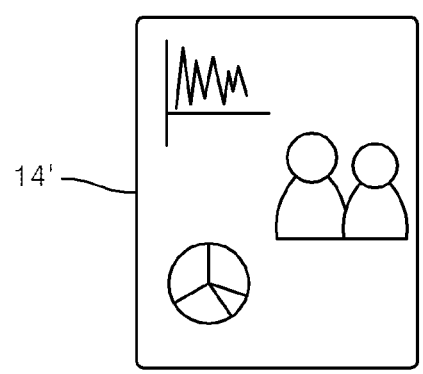
Figure 12:
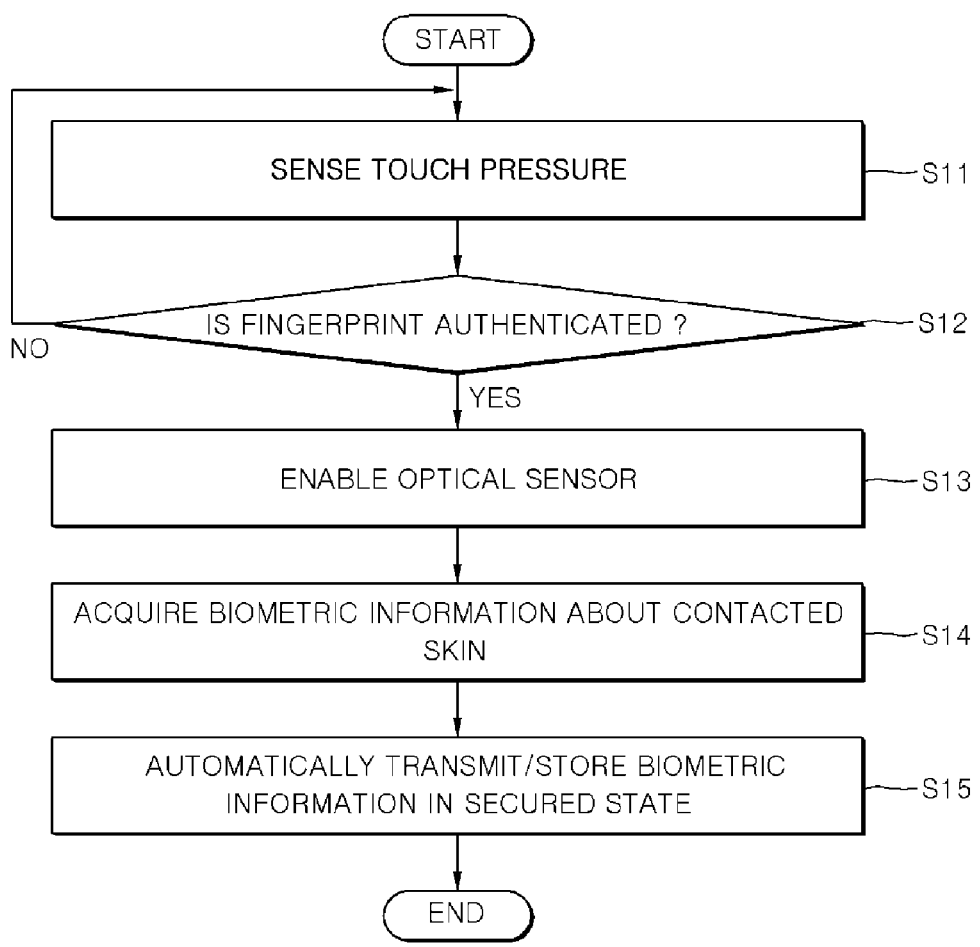
FIG. 12 is a flowchart showing a process of acquiring biometric information by using a smart watch according to an exemplary embodiment of the present invention.
Figure 13:
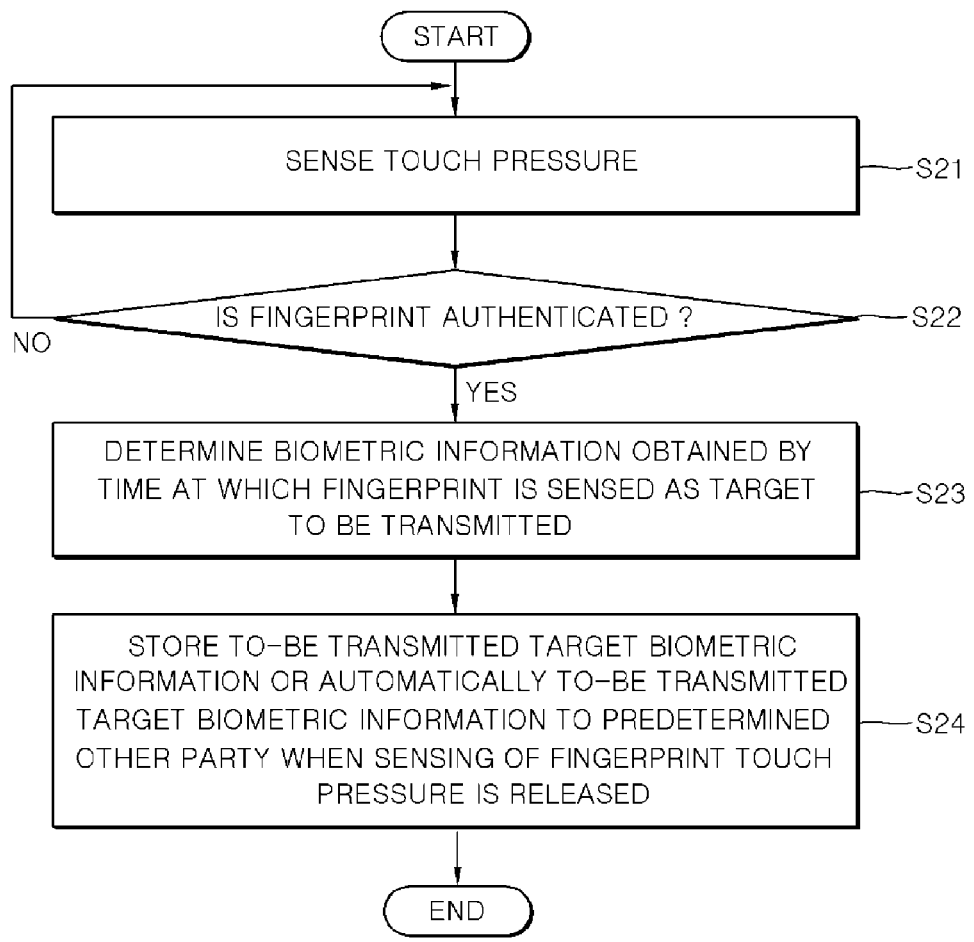
FIG. 13 is a flowchart showing a process of transmitting biometric information by using a smart watch according to an exemplary embodiment of the present invention.
Figure 14:
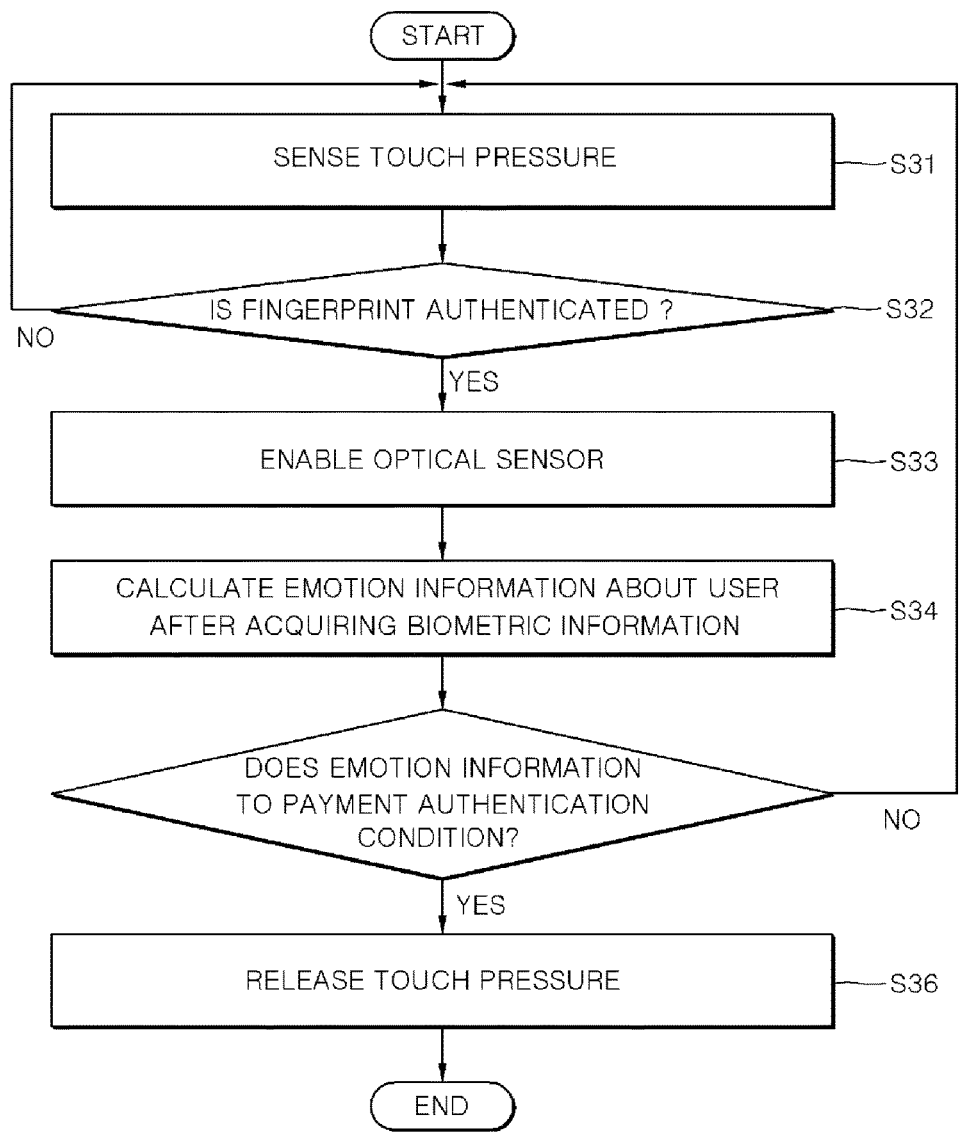
FIG. 14 is a flowchart showing a process of calculating emotion information by using a smart watch according to an exemplary embodiment of the present invention.

FIG. 7 is a flowchart showing an operation of a smart watch according to an exemplary embodiment of the present invention, FIG. 8 is a diagram illustrating an authentication process of receiving a remote medical service by using a smart watch according to an exemplary embodiment of the present invention, FIG. 9 is a diagram illustrating a process of generating a secure content by using a smart watch according to an exemplary embodiment of the present invention, FIG. 10 is a diagram illustrating a process of receiving a payment service by using a smart watch according to an exemplary embodiment of the present invention, FIG. 11 is a diagram illustrating a process of transmitting biometric information to a smart watch of another user by using a smart watch according to an exemplary embodiment of the present invention, FIG. 12 is a flowchart showing a process of acquiring biometric information by using a smart watch according to an exemplary embodiment of the present invention, FIG. 13 is a flowchart showing a process or transmitting biometric information by using a smart watch according to an exemplary embodiment of the present invention, and FIG. 14 is a flowchart showing a process of calculating emotion information by using a smart watch according to an exemplary embodiment of the present invention.

Referring to FIG. 7, a method of operating a smart watch according to an exemplary embodiment of the present invention includes a first operation (S1) of sensing a touch pressure applied to a fingerprint information acquisition unit provided on one surface of the smart watch, a second operation (S2) of comparing a magnitude of the touch pressure sensed in the first operation (S1) with a magnitude of a predetermined reference pressure, a third operation (S3) of acquiring fingerprint information and biometric information about a user by using the fingerprint information acquisition unit and a biometric information acquisition unit, which is provided on the other surface of the smart watch, for a predetermined period of time (S4) from a point in time at which the touch pressure is applied if it is determined in the first operation (S1) that the touch pressure is greater than the reference pressure; and a fourth operation (S5) of generating user authentication information by using the fingerprint information and the biometric information acquired in the third operation (S3).

The operation of the biometric information acquisition unit is instantly fixed by a touch pressure on the fingerprint information acquisition unit in the first operation (S1). According to the present application, the influence by a movement of the biometric information acquisition unit during acquisition of the biometric information is minimized, and the biometric information is precisely acquired.

Referring to FIG. 8, an authentication process for receiving a remote medical service by using the smart watch according to an exemplary embodiment of the present invention is described. First, a touch pressure equal to or greater than a predetermined setting condition is sensed through a fingerprint sensor. The touch pressure may be directly sensed through a fingerprint sensor, or may be sensed through a pressure sensor mounted on the fingerprint information acquisition unit 121. After the touch pressure is sensed, the control unit 125 is converted from an idle mode to an enabled mode, and to-be transmitted target biometric information is determined based on the point in time at which the conversion has occurred, and the determined biometric information is tagged with the sensed fingerprint information. Thereafter, the to-be transmitted target biometric information for which a user authentication is performed through the tagging of the fingerprint information is transmitted to a terminal 20 of an external medical staff having a right to access the to-be transmitted biometric information, and the external medical staff may monitor the transmitted biometric information.

In more detail, an overall determination is performed based on first biometric information measured in an idle mode in real time. Then, rotation of a user's wrist is sensed, acquisition of fingerprint information is guided through vibration or LED (visual) feedback. Then, through a touch pressure equal to or greater than a predetermined magnitude, an operation mode is converted into an enabled mode, and second biometric information, which is precise information sensed by the optical sensor which is enabled while the biometric information acquisition unit is in contact with the skin, is tagged (stored) with the fingerprint information. Then, if rotation of the user's wrist is sensed again, the tagged information is transmitted or stored while automatically displaying the tagged information through an interface. That is, the authenticated biometric information is remotely and officially transmitted to a medical staff or an external device or cloud (a predetermined address), so that the biometric information is accessed only by a person to which access is allowed.

As described above, according to an exemplary embodiment of the present invention, biometric information is individualized and coded in a simple motion. That is, biometric information obtained by separately using first biometric information acquired from a first optical sensor positioned at the other surface of the main member 12 and second biometric information acquired from a second optical sensor positioned at a region independent of the first optical sensor or by combining the first biometric information and the second biometric information is transmitted together with the fingerprint information acquired from the fingerprint sensor. In this case, with regard to determining a counterpart to which the information is transmitted, the information is transmitted to a party previously related to fingerprint information, for example, a family member, or a predetermined staff member, for example, medical personnel, emergency room personnel, and emergency call (911) center personnel. According to an exemplary embodiment of the present invention, by utilizing fingerprint information acquired by sensing a pressure on the fingerprint sensor and the first and second biometric information, the condition of a user's health is periodically transmitted to a remote medial staff such that a doctor in charge can check the received information before a video conference and conduct an effective consultation through the video conference. In addition, according to an exemplary embodiment of the present invention, the biometric information is generated as a security package, and precisely and rapidly acquired in a single motion.

In addition, the control unit 125 of the smart watch allows a remote medical interface to be automatically operated if the current situation is determined to be an emergency situation as a result of analysis of the first and second biometric information, so that authenticated biometric information about a user is transmitted to a family member related to acquired fingerprint information, a staff of a 911 emergency call center, and a medical staff who are designated in association with a condition of a user's health, thereby coping with the emergency situation. In this case, the patient may transmit authenticated biometric information to a medical staff through a series of operations, thereby omitting a process of writing a signature for access to user's information and a process such as guardian consent. In addition, a medical staff may have a reliable encounter for medical examination by viewing fingerprint information, and may provide a response in a rapid and customized manner by using the existing biometric information data. In addition, a doctor may allow all biometric information about a patient to be transmitted to related database of the doctor by touching the fingerprint information acquisition unit 121 of the smart watch.

A doctor, while performing a remote medical monitoring through the procedures described above, may send a command signal to request measurement of biometric information to a smart watch, and may provide the smart watch with a guide, such as a tactile guide, a visual guide and an audible guide according to the command signal requesting measurement of biometric information. According to an exemplary embodiment of the present invention, authenticated fingerprint information and biometric information (first and second biometric information) are acquired through a single motion, and then transmitted to a device of a doctor. A remote monitoring interface may be automatically operated on the smart watch by a command signal of the doctor. Such an interface is displayed on the display unit 14 of the smart watch, providing a UI for assisting remote monitoring. For example, when a smart watch gesture, such as rotation of a hand and lifting and lowering a hand, performs one function (a first function), the smart watch gesture may perform another function (a second function) on the remote monitoring interface. That is, alternatively, the rotation of wrist may allow biometric information to be easily transmitted to a predetermined staff member, and the gesture of lifting and lowering a hand may serve to make an emergency call, an emergency text or a request for emergency assistance. In this case, biometric information acquired until the fingerprint pressure is released to a predetermined pressure or below is determined as a unit for security and transmission.

Such a remote medical interface may be applied when a user of the smart watch enters a gym. That is, access to the gym is recognized through a GPS unit, and a time interval between a start and an end of exercise is set as a first time interval of first biometric information through a gesture, so that when the user completes the exercise and leaves the gym, biometric information of the exercise is transmitted to a medical staff or a monitoring manager (a staff in the gym). Upon touching on the fingerprint sensor, a user allows a fingerprint to be authenticated through the touch, and a user's health condition authenticated through the authentication of the fingerprint is notified through the display unit 14 or the lighting guide unit of the smart watch.

Referring to FIG. 9, a process of generating secure content by using a smart watch according to an exemplary embodiment of the present invention is described. In order to enhance a security level based on a fingerprint level and biometric authentication, a gesture that converts general content into secure content may be used. To this end, a user touches the display unit 14, and rotates a wrist of the user to enable the fingerprint information acquisition unit 121 and the biometric information acquisition unit 123. In this case, general content is converted into content of a high level of security having fingerprint authentication and biometric authentication combined with each other. Accordingly, the fingerprint authentication and the biometric authentication need to be satisfied within a predetermined period of time from a point in time at which a touch pressure has occurred on the fingerprint sensor, so that the security is enhanced.

In this case, the display unit 14 displays a GUI indicating secure content that requires authentication for the two pieces of information and displays a screen locked state.

In addition, only when the fingerprint authentication and the biometric authentication are simultaneously sensed within the predetermined period of time, the secure content is released from the locked state and access to the content is allowed. If the fingerprint authentication and the biometric authentication are not simultaneously sensed within the predetermined period of time, final authentication is not achieved.

Referring to FIG. 10, a process of receiving a payment service by using a smart watch according to an exemplary embodiment of the present invention is described. First, a user performs payment through a payment terminal 30, and payment information is displayed through the display unit 14 of the smart watch. In this case, the display unit 14 is connected to Bluetooth and NFC through various gestures, to display the total amount of payment.

That is, when a payment related smart application requires a high level of an authentication procedure different from a general case depending on the amount of payment or the purchased item, payment authentication is designed to be completed by sensing a rotation of a user's wrist or by fingerprint authentication and biometric authentication. In this case, in order to complete the payment authentication, a lighting guide unit or a haptic guide unit may be used. When a rotation of a user's wrist is sensed, information about payment completion is displayed through the display unit 14.

In more detail, a touch pressure equal to or greater than a predetermined level on the fingerprint information acquisition unit 121 provided with the fingerprint sensor is sensed, and the fingerprint sensor and the optical sensor are converted into enabled modes. The fingerprint authentication and the biometric authentication are performed through the converted fingerprint sensor and optical sensor for a predetermined period of time. In this case, only when the fingerprint authentication and the biometric authentication are completed within the predetermined period of time, a task having a high level of security is processed.

That is, while a payment related application is being executed on the smart watch, a payment authentication command signal is generated. The payment authentication command signal is a command signal caused by various trigger events, such as a touch gesture, a gesture input event in a space, a voice input event or a physical contact event with an external device, such as a payment terminal. In this case, under the condition that the payment authentication is required in response to the generated payment authentication command signal, a user who wears the smart watch applies a touch pressure equal or greater than a predetermined magnitude to the fingerprint sensor, and accordingly, first biometric information having a first period of time is acquired together with fingerprint information. If the mental status or the emotional status of the user wearing the smart watch is determined to be abnormal or inappropriate for a payment authentication in the first period of time from the point in time at which the touch pressure has occurred through the first biometric information, or the user satisfies a predetermined payment authentication nonconformity condition, even if the authentication procedure for the fingerprint information is completed, the payment authentication process does not proceed as a result of determination of payment authentication nonconformity through the first biometric information. For example, if a user wearing the smart watch has a unstable mental status, such as high in a stress index, excitement state or drowsy state, different from a normal status that is previously stored or recognized at ordinary times at the time when a touch pressure equal to or greater than a predetermined magnitude is applied to the fingerprint sensor, the final payment authentication procedure is blocked in the determination process on first biometric information or first and second biometric information even if fingerprint information is normally completed with user authentication.

In addition, the mental status of a user wearing the smart watch is recognized in advance through datamining using second biometric information that corresponds to overall biometric information about the user wearing the smart watch, and a payment authentication nonconformity condition is finally determined after acquisition of first biometric information so that the maximum expense for payment is flexibly adjusted. Although the above description is made based on the final payment authentication procedure is blocked at the time of the payment, payment may be cancelled after the payment authentication, or information associated with management about a purchase habit or a payment habit, that is, information for adjusting the maximum expense may be acquired. According to the exemplary embodiment of the present invention, a purchase habit is managed in consideration of an impulsive purchase is likely to occur under high level of stress.

That is, according to the exemplary embodiment of the present invention, a precaution or a follow up may be performed with respect to an unfair payment authentication, an unstable payment authentication or a mistakenly performed payment authentication by using fingerprint information and first biometric information that are acquired through a single motion. In particular, so as to pay for a high priced product or service, the level of authentication may be raised through double authentication using fingerprint information and biometric information, so that payment or payment cancellation may be effectively performed. In addition, with a payment related application being executed on a smart watch, GPS information, schedules before/after the payment and the average price of products in a shop are acquired as context information for an onsite payment, and the frequency of previous payments and stress index are acquired as context information for an online payment, and by using first biometric information, the mental status or the emotion of a user may be determined. According to the result of determination, the maximum expense of payment, the range of a product for payment and the environment of payment may be automatically set, so that a user may achieve desired financial management.

Referring to FIG. 11, a process of transmitting biometric information to a smart watch of another user by using a smart watch according to an exemplary embodiment of the present invention is described. First, when a rotation is sensed by a smart watch of a user, fingerprint information about another user (for example, a parent, emergency call center (911) personnel, and a doctor) is recognized through a device of the other user. Thereafter, biometric information about the user is recognized, and if fingerprint information stored in the device of the other user coincides with fingerprint information sensed by the smart watch, the recognized biometric information is automatically transmitted to the device of the other user such that the biometric information is displayed on a display of the device of the other user and accessible.

According to the embodiment of the present invention, when a predetermined fingerprint of the other user rather than a fingerprint of the user is sensed, biometric information about the user is automatically and immediately transmitted to the device of the other user or transmitted to an external device, such as a cloud based on the point in time at which a touch pressure has occurred, so as to be accessed by the other user.

For example, in a state in which a smart application related to transmitting biometric information to a device of another user is executed, a doctor brings his or her fingerprint into contact with a fingerprint sensor of a smart watch of a user as if checking a pulse, fingerprint information obtained through the touch is compared with previously stored fingerprint information or a remote monitoring doctor list is browsed in the cloud through a remote medical interface, and if the fingerprint information is determined as belonging to predetermined people (a family member and a friend) or a medical specialist, first biometric information and second biometric information may be automatically transmitted to a terminal 14' of the doctor.

Referring to FIG. 12, a process of acquiring biometric information using a smart watch according to an exemplary embodiment of the present invention is described. First, when a touch pressure event occurs on the fingerprint information acquisition unit 121 (S11), a fingerprint authentication process (S12) is performed, and then the fingerprint information acquisition unit 121 and the biometric information acquisition unit 123 are enabled (S13). According to the enabling of the biometric information acquisition unit 123, light is radiated onto an arterial blood vessel of the skin that makes contact with a light source, and biometric information, such as a pulse rate, heartbeats and oxygen saturation, may be measured through the biometric information acquisition unit 123 (S14) and the acquired biometric information is stored in a secured state or immediately transmitted to a predetermined address together with the acquired fingerprint information (S15).

Referring to FIG. 13, a process of transmitting biometric information using a smart watch according to an exemplary embodiment of the present invention is described. First, when a touch pressure event occurs on the fingerprint information acquisition unit 121 (S21), a fingerprint authentication process (S22) is performed, and then biometric information obtained by the point in time at which the fingerprint is sensed is determined as a to-be transmitted target (S23). Thereafter, when the sensing of the touch pressure is released, the to-be transmitted biometric information is stored or automatically transmitted to a predetermined other party (S24).

Referring to FIG. 14, a process of calculating emotion information using a smart watch according to an exemplary embodiment of the present invention is described. First, when a touch pressure event occurs on the fingerprint information acquisition unit 121 (S31), a fingerprint authentication process (S32) is performed, and then the fingerprint information acquisition unit 121 and the biometric information acquisition unit 123 are enabled (S33). Thereafter, emotion information (that is, a mental status and a stress index of a user) obtained by performing datamining on the first biometric information and the second biometric information is calculated (S34), and when the emotion information corresponds to a predetermined payment authentication condition (S35), a result of the fingerprint having passed the authentication is not processed or a limit suitable for a corresponding context is set. The datamining is performed by performing a correlation extraction between payment and emotion information and the first biometric information and the second biometric information. In addition, the payment authentication condition may be set by a user, or may be set using average reference information. In addition, the limit may include contents related to an adjustment of the maximum expense, a notification to a person in charge, and a call for assistance from the police or an acquaintance. When the touch pressure of the user is released (S36), the emotion information calculating process ends.

Figure 15:
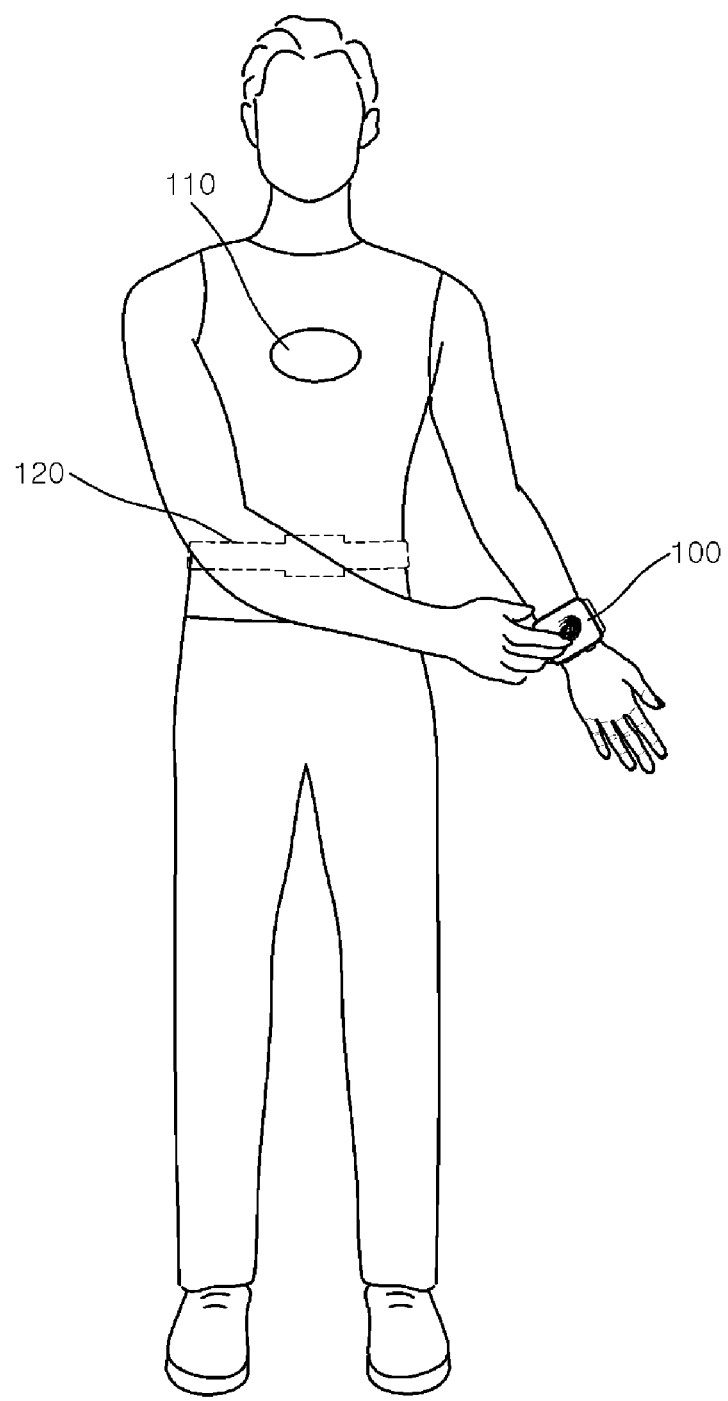
FIG. 15 is a diagram illustrating an example in which smart clothes worn on a human body interwork with a smart watch according to an exemplary embodiment of the present invention.
Figure 16:
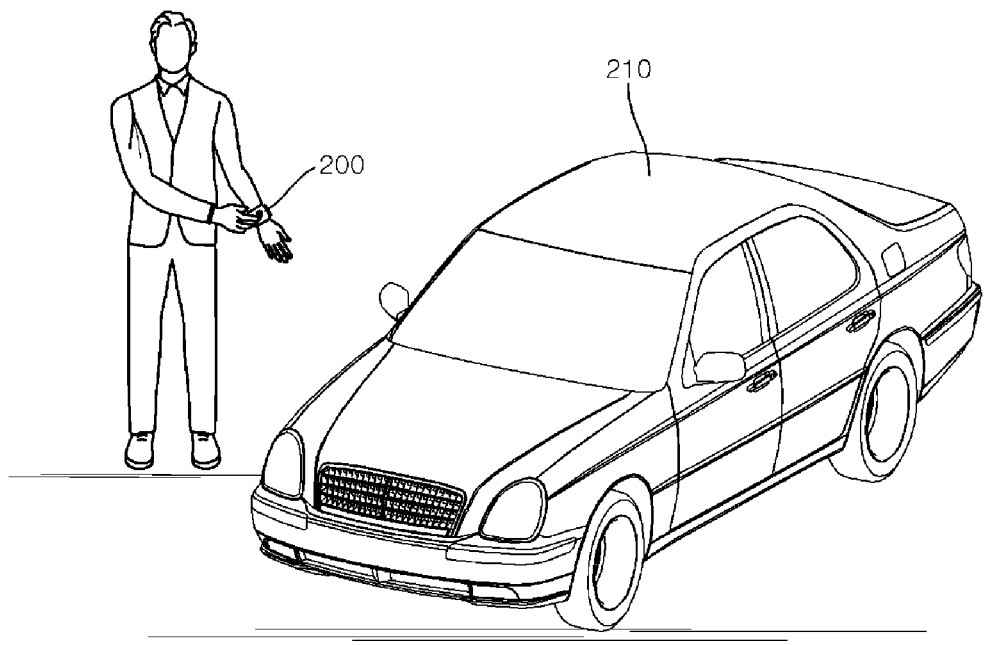
FIG. 16 is a diagram illustrating an example in which a smart automobile interworks with a smart watch according to an exemplary embodiment of the present invention.
Figure 17:
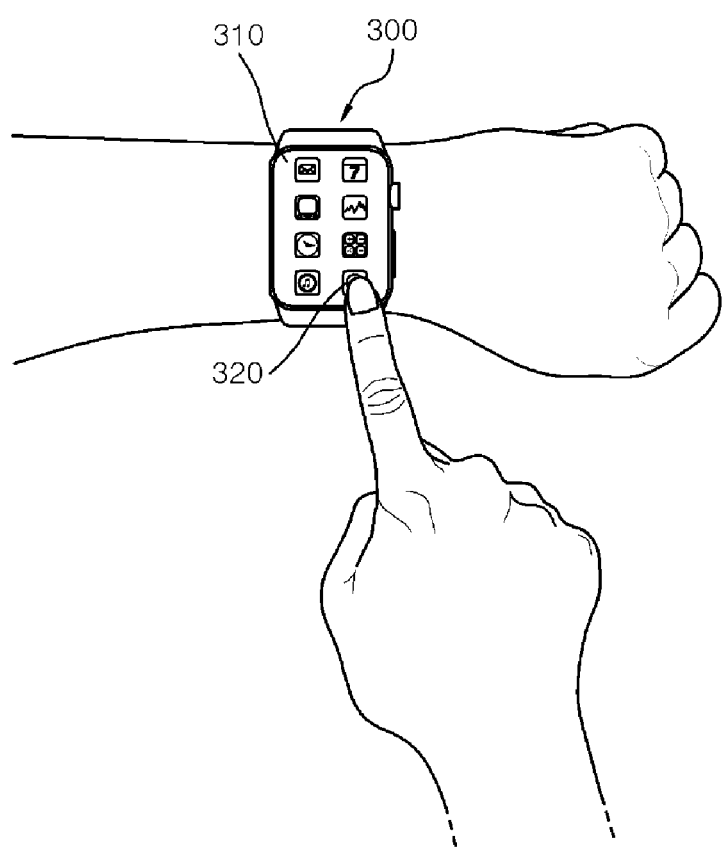
FIG. 17 is a diagram illustrating a finger information acquisition unit coupled to a smart watch according to an exemplary embodiment of the present invention.
Figure 18:
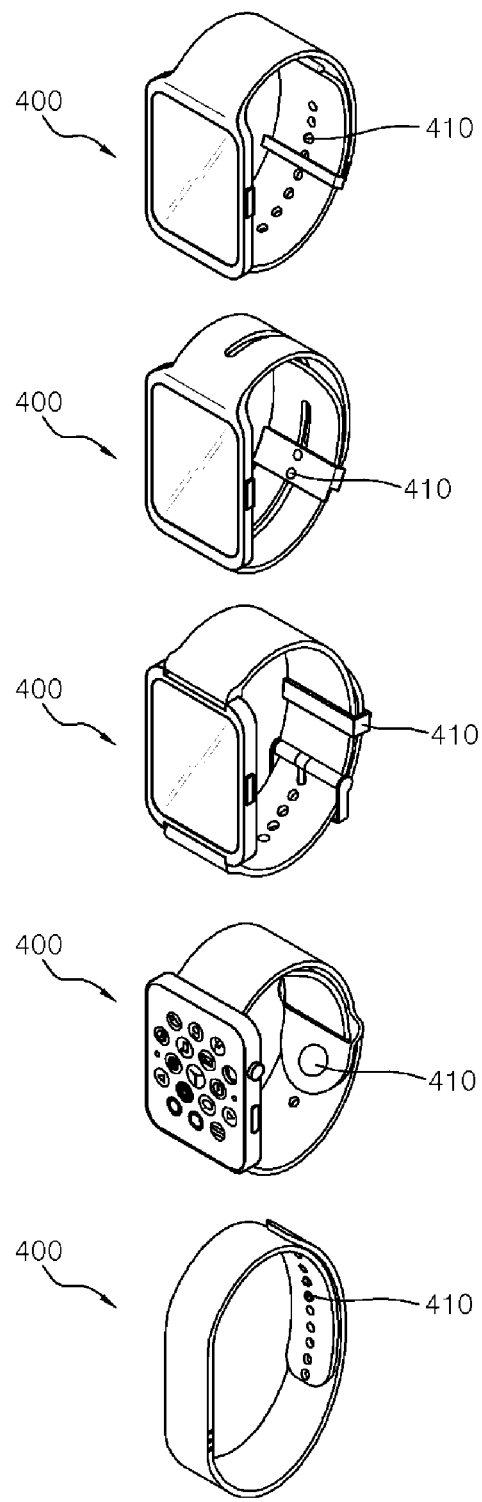
FIG. 18 is a diagram illustrating an example in which an optical sensor is provided in the form of a probe in a smart watch according to an exemplary embodiment of the present invention.
Figure 19:
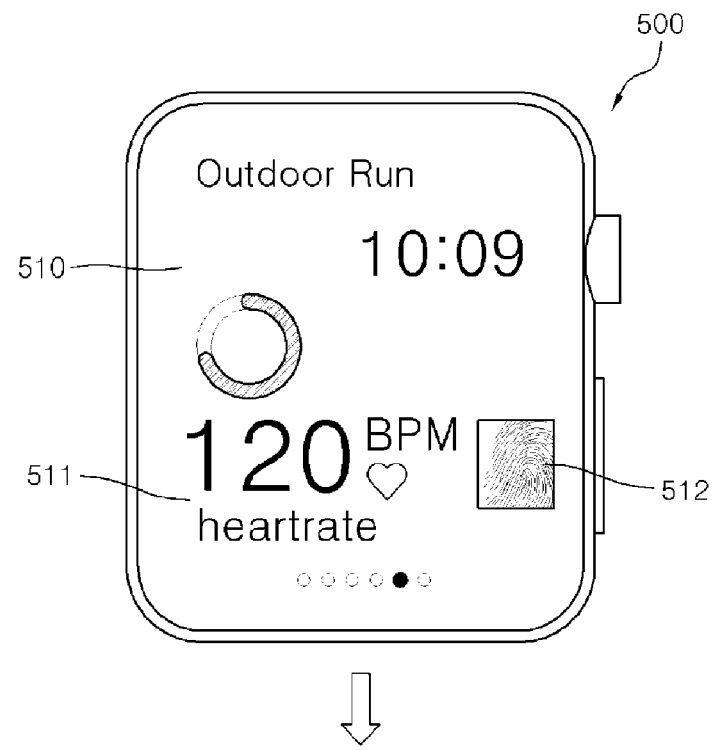
FIG. 19 is a diagram illustrating a state in which biometric information is displayed on a display unit of a smart watch according to an exemplary embodiment of the present invention.
Figure 19:
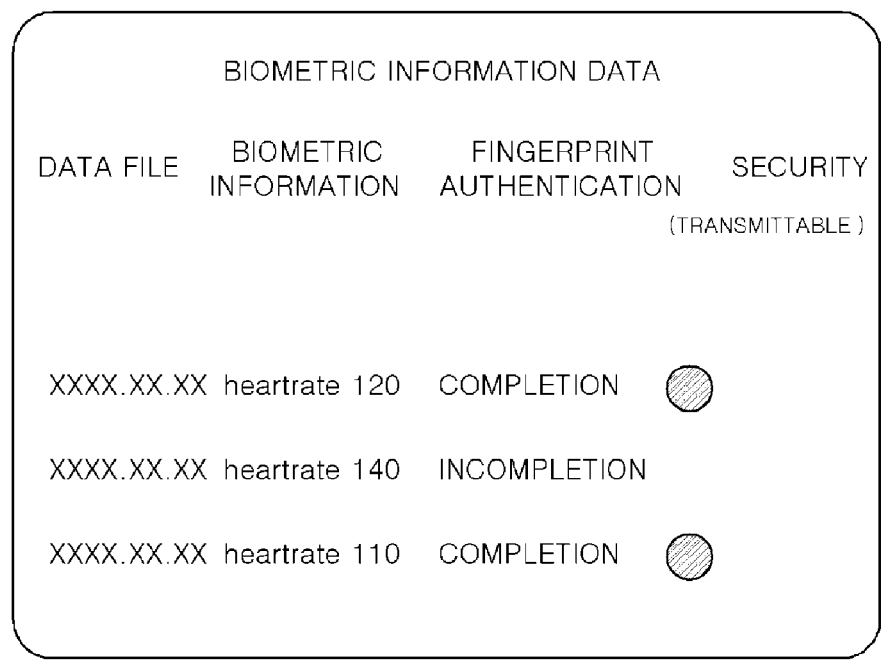

FIG. 15 is a diagram illustrating an example in which a smart clothes worn on a human body interwork with a smart watch according to an exemplary embodiment of the present invention, FIG. 16 is a diagram illustrating an example in which a smart automobile is associated with a smart watch according to an exemplary embodiment of the present invention, FIG. 17 is a diagram illustrating a finger information acquisition unit coupled to a smart watch according to an exemplary embodiment of the present invention, FIG. 18 is a diagram illustrating an example in which an optical sensor is provided in the form of a probe in a smart watch according to an exemplary embodiment of the present invention, and FIG. 19 is a diagram illustrating a state in which biometric information is displayed on a display unit of a smart watch according to an exemplary embodiment of the present invention.

Referring to FIG. 15, a smart watch according to an exemplary embodiment of the present invention may interwork with smart clothes worn on a human body.

According to an exemplary embodiment of the present invention, the smart clothes is provided with a bio sensor 110 to acquire biometric information, such as a blood pressure and the temperature of a user, a bend sensor 120 to sense the posture of a user, a proximity sensor and an image sensor. According to an exemplary embodiment of the present invention, biometric information, posture tracking information and outside environment information about a user sensed by the biometric information sensor provided on the smart clothes is transmitted to a smart watch 100 worn by the user. The smart clothes are provided with a near field communication unit or conductive fabric, and information sensed by the biometric information sensor is transmitted to the smart watch 100 by a predetermined period through the near field communication unit or the conductive fabric.

In addition, sensing information sensed by the biometric information sensor of the smart clothes may be received through information input into an information input unit (not shown) of the smart watch 100, such as a touch, a gesture in a space and a voice input. In this case, the sensing information received by the smart watch 100 may be viewed through a screen of the smart watch 100.

In addition, the information sensed by the biometric information sensor provided on the smart clothes may be transmitted to an external device or a cloud through fingerprint information obtained by a fingerprint sensor provided on the smart watch 100 and activation of an optical sensor provided on the smart watch 100. In this case, the external device represents a device that is not worn by a user, but physically divided from the user, such as a smart phone, a smart automobile, a remote medical system and a payment terminal.

Referring to FIG. 16, a smart watch according to an exemplary embodiment of the present invention may interwork with a smart automobile.

According to the exemplary embodiment of the present invention, a user may start a vehicle 210 by using fingerprint information and biometric information sensed by a fingerprint sensor and a biometric information sensor of a smart watch 200, respectively.

In this case, the smart watch 200 may control an operation of the vehicle 210 if fingerprint information about the user is verified but it is determined that the user is excited or drunk or under a high level of stress. For example, the smart watch 200 may prevent the vehicle 210 from being started, or control the vehicle to operate only in an automatic driving mode if it is determined that a user has a difficulty in driving by himself.

In addition, the check result of the fingerprint information and biometric information through the smart watch 200 may be displayed on a head up display (HUD) or an instrument display of the vehicle 210, and may be shared with a user of another vehicle.

In addition, depending on the check result of the biometric information, functions of the vehicle 210, such as the temperature adjustment of an air conditioner and the vehicle speed limit, may be controlled while driving.

Referring to FIG. 17, a smart watch 300 according to an exemplary embodiment of the present invention may include a display 310 and a fingerprint information acquisition unit 320 coupled to the display 310. That is, according to the exemplary embodiment of the present invention, the fingerprint information acquisition unit 320 provided with a fingerprint sensor may be integrally formed with the display 310 rather than provided on one region of a strap. According to such a configuration, the smart watch 300 senses fingerprint information about a user through a touch on the display 310 provided on one surface of the smart watch 300, and acquires biometric information about the user through an optical sensor located at the other surface of the smart watch 300, opposite to the one surface of the smart watch 300, in response to a pressure caused by the touch. In this case, the optical sensor may be positioned on the strap.

According to the exemplary embodiment of the present invention, touch integrated type fingerprint recognition is applied so that a screen of the display is used as a tool for fingerprint recognition without needing a specific button and space. For example, the smart watch 300 enables the screen to perform fingerprint recognition regardless of a region of the screen, which enables various security solutions and services to be adopted. In this case, the smart watch 300 has a sensor pattern layer, a sensor circuit and a micro-signal detecting circuit that are integrated between the display 310 and a cover glass of the smart watch 300 to recognize fingerprints.

Referring to FIG. 18, a smart watch 400 according to an exemplary embodiment of the present invention may include an optical sensor provided in the form of a probe. That is, according to the exemplary embodiment of the present invention, an optical sensor 410 may be provided in various probe types on a band member forming the smart watch 400.

Referring to FIG. 19, a smart watch 500 according to an exemplary embodiment of the present invention may acquire biometric information for which fingerprint authentication is completed through a single motion, and may display the acquired biometric information on a display 510.

That is, the smart watch 500 according to the exemplary embodiment of the present invention may display completion information 512 about authentication of a fingerprint and biometric information 511 on a single display 510. In addition, the display 510 of the smart watch 500 may display a UI that allows biometric information combined with security information to be immediately transmitted to an external device. As for biometric information that is not combined with security information, the display 510 of the smart watch 500 may display a UI that additionally requires a user authentication procedure, such as fingerprint authentication.

The smart watch according to an exemplary embodiment of the present invention and a method of operating the same can measure fingerprint information and biometric information in a single motion, set a specific duration so that biometric information measured in the specific duration is authenticated or secured, and transmitted or output to the outside. In addition, the smart watch according to an exemplary embodiment of the present invention and a method of operating the same can convert a fingerprint sensor and an optical sensor from an idle mode, which corresponds to a disabled state, into an enabled state, by sensing a touch pressure of a predetermined condition or above, store fingerprint information and biometric information within a specific duration at the time of being converted into the enabled mode so that the fingerprint information and the biometric information may be tagged with each other, accessed or transmitted, or may be used as authenticated biometric information in response to occurrence of an event from an external device. In addition, the smart watch according to an exemplary embodiment of the present invention and a method of operating the same can combine fingerprint information and biometric information with each other to generate information with a high level of security, or enable a high level of authentication procedure to be performed in a series of operations.

Although few embodiments have been shown and described, the above embodiments are illustrative purpose only in implementing the smart watch according to the present invention and the operating method thereof, and it will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A smart watch comprising:
a body capable of being worn on one wrist of a user;
a fingerprint information acquisition unit provided on one surface of the body and configured to acquire fingerprint information about a finger connected to another wrist of the user by a touch pressure applied from an outside, the fingerprint information acquisition unit including a pressure sensor and a fingerprint sensor;
a biometric information acquisition unit provided on the other surface of the body, opposite to the one surface of the body, and configured to acquire biometric information about the user while in contact with a skin of said one wrist of the user, the biometric information acquisition unit including an optical sensor which faces the skin of said one wrist of the user; and
a control unit provided in the body,
wherein:
the optical sensor is disposed directly below the fingerprint information acquisition unit, with a layer being interposed between the optical sensor and the finger information acquisition unit, such that the optical sensor, when taken from a plan view of the fingerprint information acquisition unit, is covered and overlapped by the fingerprint information acquisition unit,
the pressure sensor senses the touch pressure applied to the fingerprint information acquisition unit,
when the touch pressure sensed by the pressure sensor is equal to or greater than a reference pressure at a point in time, the control unit converts an operation mode of the fingerprint sensor and the optical sensor into an enabled mode, such that the fingerprint sensor senses and acquires the fingerprint information from the finger connected to said another wrist of the user and the optical sensor senses and acquires the biometric information from the said one wrist of the user for a predetermined time period from the point in time, and
the control unit generates user authentication information by using the acquired fingerprint information and biometric information.

2. The smart watch of claim 1, wherein the body includes:
a main member; and
a band member having one end thereof coupled to one side portion of the main member and having the other end thereof, opposite to the one end thereof, formed with at least one insertion hole,
wherein:
the main member is provided at the one end of the band member and is configured to have a first surface and a second surface, which are opposite to each other;
the fingerprint sensor is provided on the first surface of the main member and the optical sensor is provided on and protruding from the second surface of the main member;
the optical sensor protruding from the second surface of the main member at the one end of the band member is configured to be inserted into the insertion hole of the other end of the band member, and connects the one end with the other end of the band member.

3. The smart watch of claim 2, wherein the biometric information acquisition unit is further provided with a proximity sensor unit that senses a contact area or a degree of proximity with respect to the skin of the user, and
the biometric information acquisition unit operates the optical sensor when the contact area or the degree of proximity sensed by the proximity sensor unit satisfies predetermined condition information.

4. The smart watch of claim 3, further comprising a display unit formed on the one surface of the main member or at the band member and electrically connected to the control unit to display a graphic user interface (GUI) corresponding to the fingerprint information or the biometric information,
wherein the display unit outputs predetermined guide information until the contact area or the degree of proximity sensed by the proximity sensor unit satisfies the predetermined condition information.

5. The smart watch of claim 2, wherein the optical sensor senses contact with the insertion hole or a state of approach to the insertion hole within a predetermined distance, and
the control unit, when the optical sensor is in contact with the insertion hole or in a state of approach to the insertion hole within the predetermined distance, converts an operation mode of the smart watch into an idle mode such that the biometric information acquisition unit operates to acquire first biometric information for a first period of time from a point in time of the contact with the insertion hole or the state of approach to the insertion hole within a predetermined distance.

6. The smart watch of claim 5, wherein the pressure sensor is provided at the one surface of the main member, and
in the enabled mode, the optical sensor operates to acquire second biometric information for a second period of time from the point in time, and
the second period of time is a duration in which the touch pressure is maintained within a predetermined range.

7. The smart watch of claim 4, wherein the display unit formed on the band member is provided with a biometric information acquisition unit including at least one biometric information sensor formed to protrude from one surface thereof to contact the skin.

8. The smart watch of claim 6, wherein:
a lighting guide unit that is turned on in the enabled mode is provided at the one surface of the main member; and
a haptic driving unit that operates in the enabled mode is provided at the other surface or inside of the main member.

9. The smart watch of claim 4, wherein the control unit comprises:
  a memory unit configured to store the first biometric information, the second biometric information, fingerprint information, previously measured fingerprint information, information about a point in time when each of the first biometric information, the second biometric information, the fingerprint information and the previously measured fingerprint information is acquired, information about a point in time when the touch pressure is equal to or greater than the reference pressure, and the user authentication information;
  an authentication information generation unit configured to generate the user authentication information by applying the fingerprint information and the second biometric information to a predetermined authentication program;
  a security authentication unit configured to perform authentication on the user authentication information and authentication request information that is received from the fingerprint information acquisition unit or an external device; and
  an information transmitting unit configured to transmit the fingerprint information and the second biometric information to the display unit or the external device after the authentication is completed,
  wherein the memory unit stores information about a receiver to which the first biometric information, the second biometric information and the fingerprint information are transmitted through the information transmission periodically or upon occurrence of an event.

10. The smart watch of claim 9, wherein the control unit further comprise a motion sensing unit, wherein the control unit acquires the fingerprint information and the second biometric information about the user through the fingerprint information acquisition unit and the biometric information acquisition unit and when a motion of the user is sensed through the motion sensing unit, stores the acquired fingerprint information and the acquired second biometric information through the memory unit or transmits the acquired fingerprint information and the acquired second biometric information through the information transmitting unit.

11. The smart watch of claim 9, wherein the control unit further comprises a data processing unit configured to perform datamining on the first biometric information and the second biometric information that are stored in the memory unit,
  wherein the information transmitting unit transmits the information having been subjected to the datamining to the display unit or the external device after the authentication is completed.

12. The smart watch of claim 11, wherein a stem that is rotatable is provided at one side of the display unit,
  wherein the control unit increases a scrolling speed of the display unit when the stem rotates in a direction opposite to a direction in which a wrist of a user wearing the smart watch is rotated.

13. The smart watch of claim 9, wherein the control unit further comprises an emotion information calculation unit configured to calculate emotion information about the user by applying the second biometric information to a predetermined state estimation algorithm,
  wherein the information transmitting unit transmits the emotion information to the display unit or the external device after the authentication is completed.

14. The smart watch of claim 9, wherein the memory unit stores a smart application to perform a plurality of additional functions of the smart watch,
  wherein the control unit further comprises:
  a signal receiving unit configured to receive at least one event signal from the external device; and
  an interface unit configured to perform an additional function corresponding to the at least one event signal by execution of the smart application.

15. The smart watch of claim 9, wherein the memory unit stores fingerprint information about a plurality of fingers of the user and a smart application configured to perform additional functions corresponding to the respective pieces of fingerprint information,
  wherein the control unit further comprises a fingerprint matching unit configured to match the respective pieces of fingerprint information about the plurality of fingers with the additional functions corresponding to the respective pieces of fingerprint information.

16. The smart watch of claim 9, wherein the memory unit stores a smart application configured to perform a payment function, and in accordance with the emotion information, perform a payment authentication function,
  wherein the control unit further comprises a payment authentication unit configured to stop the payment function or cancel payment when the emotion information corresponds to predetermined payment authentication nonconformity condition information.

17. The smart watch of claim 9, wherein the control unit further comprises:
  an emergency situation determination unit configured to determine occurrence of an event when the first biometric information and the second biometric information correspond to predetermined emergency determination condition information;
  a global positioning system (GPS) unit configured to detect location information about the smart watch; and
  an event occurrence determination unit configured to determine that an event has occurred when the location information is determined to be within a predetermined zone.

18. The smart watch of claim 9, wherein the memory unit stores authentication information about another user corresponding to the authentication information about the user, and
  the security authentication unit completes the authentication by using the authentication information about the other user upon receiving authentication request information from the external device.

19. A smart watch comprising:
  a body capable of being worn on one wrist of a user;
  a fingerprint information acquisition unit provided on one surface of the body and configured to acquire fingerprint information about a finger connected to another wrist of the user by a touch pressure applied from an outside, the fingerprint information acquisition unit including a pressure sensor and a fingerprint sensor;
  a first biometric information acquisition unit and a second biometric information acquisition unit respectively provided at a first area and a second area of the other surface of the body, opposite to the one surface of the body, and configured to acquire biometric information about the user while in a state of contact with a skin of said one wrist of the user, the biometric information acquisition unit including an optical sensor which faces the skin of said one wrist of the user; and
  a control unit provided in the body, wherein:
the optical sensor is disposed directly below the fingerprint information acquisition unit, with a layer being interposed between the optical sensor and the finger information acquisition unit, such that the optical sensor, when taken from a plan view of the fingerprint information acquisition unit, is covered and overlapped by the fingerprint information acquisition unit,
the pressure sensor senses the touch pressure applied to the fingerprint information acquisition unit,
when the touch pressure sensed by the pressure sensor is equal to or greater than a reference pressure at a point in time, the control unit converts an operation mode of the fingerprint sensor and the optical sensor into an enabled mode, such that the fingerprint sensor senses and acquires the fingerprint information from the finger connected to said another wrist of the user and the optical sensor senses and acquires the biometric information from the said one wrist of the user for a predetermined time period from the point in time, and the control unit generates user authentication information by using the acquired fingerprint information and biometric information.

* * * * *